US007328162B2

(12) United States Patent
Liljeryd et al.

(10) Patent No.: US 7,328,162 B2
(45) Date of Patent: Feb. 5, 2008

(54) SOURCE CODING ENHANCEMENT USING SPECTRAL-BAND REPLICATION

(75) Inventors: Lars Gustaf Liljeryd, Solna (SE); Per Rune Albin Ekstrand, Stockholm (SE); Lars Fredrik Henn, Bromma (SE); Hans Magnus Kristofer Kjörling, Uppsala (SE)

(73) Assignee: Coding Technologies AB, Stockholm (SE)

( * ) Notice: Subject to any disclaimer, the term of this patent is extended or adjusted under 35 U.S.C. 154(b) by 657 days.

(21) Appl. No.: 10/681,105

(22) Filed: Oct. 9, 2003

(65) Prior Publication Data
US 2004/0078194 A1    Apr. 22, 2004

Related U.S. Application Data

(62) Division of application No. 09/230,799, filed as application No. PCT/IB98/00893 on Jun. 9, 1998, now Pat. No. 6,680,972.

(30) Foreign Application Priority Data

| Jun. 10, 1997 | (SE) | ................................. 9702213 |
| Dec. 12, 1997 | (SE) | ................................. 9704634 |
| Jan. 30, 1998 | (SE) | ................................. 9800268 |

(51) Int. Cl.
*G10L 21/04* (2006.01)
(52) U.S. Cl. .................................................. 704/503
(58) Field of Classification Search ..................... None
See application file for complete search history.

(56) References Cited

U.S. PATENT DOCUMENTS

| 4,150,253 A | | 4/1979 | Knoppel |
| 4,667,340 A | | 5/1987 | Arjmand et al. |
| 4,731,852 A | | 3/1988 | Liljeryd |
| 4,771,465 A | | 9/1988 | Bronson et al. |
| 4,776,014 A | | 10/1988 | Zinser, Jr. .................. 704/262 |
| 4,790,016 A | | 12/1988 | Mazor et al. ............... 704/203 |
| 5,040,217 A | | 8/1991 | Brandenburg et al. |
| 5,068,899 A | | 11/1991 | Ellis et al. |
| 5,127,054 A | | 6/1992 | Hong et al. |
| 5,388,181 A | * | 2/1995 | Anderson et al. ......... 704/200.1 |

(Continued)

OTHER PUBLICATIONS

"Audio Spectral Coder", by Anibal J. S. Ferreira, AES Reprint 4201, 100th Convention, Copenhagen, May 11, 1996, XP002100534, pp. 1-16.

(Continued)

*Primary Examiner*—David Hudspeth
*Assistant Examiner*—Brian Albertalli
(74) *Attorney, Agent, or Firm*—Michael A. Glenn; Glenn Patent Group

(57) ABSTRACT

The present invention proposes a new method and apparatus for the enhancement of source coding systems. The invention employs bandwidth reduction (101) prior to or in the encoder (103), followed by spectral-band replication (105) at the decoder (107). This is accomplished by the use of new transposition methods, in combination with spectral envelope adjustments. Reduced bitrate at a given perceptual quality or an improved perceptual quality at a given bitrate is offered. The invention is preferably integrated in a hardware or software codec, but can also be implemented as a separate processor in combination with a codec. The invention offers substantial improvements practically independent of codec type and technological progress.

8 Claims, 13 Drawing Sheets

U.S. PATENT DOCUMENTS

| | | | |
|---|---|---|---|
| 5,436,940 A | 7/1995 | Nguyen | |
| 5,684,920 A | 11/1997 | Iwakami et al. | |
| 5,687,191 A | 11/1997 | Lee et al. | |
| 5,692,050 A | 11/1997 | Hawks | 381/1 |
| 5,717,823 A * | 2/1998 | Kleijn | 704/220 |
| 5,822,370 A | 10/1998 | Graupe | 375/240 |
| 6,049,766 A * | 4/2000 | Laroche | 704/216 |
| 6,232,540 B1 * | 5/2001 | Kondo | 84/612 |
| 6,484,137 B1 * | 11/2002 | Taniguchi et al. | 704/211 |

OTHER PUBLICATIONS

*High-Frequency Regeneration in Speech Coding Systems*, John Makhoul and Michael Berouti, Bolt Beranek and Newman, Inc., MA, pp. 428-431, IEEE 1979.

*Discovering Inner Complexity: Time Shifting and Transposition with a Real-Time Granulation Technique*, Barry Truax, Computer Music Journal, 18:2, pp. 38-38, Summer 1994.

*Statistical Recovery of Wideband Speech from Narrowband Speech*, Yan Ming Cheng, Douglas O'Shaughnessy, and Paul Mermelsuein, IEEE Transactions on Speech and Audio Processing, vol. 2, No. 4, Oct. 1994.

*Quality Enhancement of Band Limited Speech by Filtering and Multirate Techniques*, Hiroshi Yasukawa, NTT Transmission Laboratories, Yokosuka-shi, Kanagawa, 238-03, Japan.

*An Efficient Method for Pitch Shifting Digitally Sampled Sounds*, Keith Lent, Computer Music Journal, Massachusetts Institute of Technology, vol. 13, No. 4, Winter 1989.

Audio Spectral Coder, A.J.S. Ferreira, AES Preprint 4201, 100th Convention, May 11-14, 1996, Copenhagen.

Improving Audio Codecs ;by Noise Substitution, D. Schultz, JAES, vol. 44, No. 7/8, 1996.

Introduction to Perceptual Coding, K. Brandenburg, AES, Collected Papers on Digital Audio Bitrate Reduction, 1996.

Lapped Transforms for Efficient Transform/Subband Coding, H. S. Malvar, IEEE Trans ASSP, vol. 38, No. 6, 1990.

*Multirate Systems and Filter Banks*, P. P. Vaidyanathan, Prentice Hall, Englewood Cliffs, New Jersey, 1993, ISBN 0-13-605718-7.

*Pattern Search Prediction of Speech*, R. Bogner T. Li, Proc. ICASSP '89, vol. 1, May 1989.

*The Application of Generalized Linearity to Automatic Gain Control*, T.G. Stockham, Jr., IEEE Trans. on Audio and Electroacoustics, vol. Au-16, No. 2, Jun. 1968.

*Time-Scale Modification of Speech based on a Nonlinear Oscillator Model*, G. Kubin, W. B. Kleijn, IEEE, 1994.

*Vector Quantization and Signal Compression*, A. Gersho, R.M. Gray, Kluwer Academic Publishers, USA 1992, ISBN 0-7923-9181-0.

*Tonal Consonance and Critical Bandwidth*, R. Plomp, W.J.M. Levelt JASA, vol. 38, 1965.

*Implementation of the Digital Phase Vocoder Using the Fast Fourier Transform*, M.R. Portnoff, IEEE ASSP, vol. 24, No. 3, 1976.

* cited by examiner

SOURCE CODING ENHANCEMENT USING SPECTRAL-BAND REPLICATION

This application is a divisional of application Ser. No. 09/230,799, filed on Feb. 9, 1999 now U.S. Pat. No. 6,680, 972, and for which priority is claimed under 35 U.S.C. § 120. Application Ser. No. 09/230,799 is the national phase of PCT International Application No. PCT/IB98/00893 filed on Jun. 9, 1998 under 35 U.S.C. § 371. The entire contents of each of the above-identified applications are hereby incorporated by reference. This application also claims priority of Application Nos. 9702213-1; 9704634-6; and 9800268-6 filed in Sweden on Jun. 10, 1997; Dec. 12, 1997; and Jan. 30, 1998, respectively under 35 U.S.C. § 119.

TECHNICAL FIELD

In source coding systems, digital data is compressed before transmission or storage to reduce the required bitrate or storing capacity. The present invention relates to a new method and apparatus for the improvement of source coding systems by means of Spectral Band Replication (SBR). Substantial bitrate reduction is achieved while maintaining the same perceptual quality or conversely, an improvement in perceptual quality is achieved at a given bitrate. This is accomplished by means of spectral bandwidth reduction at the encoder side and subsequent spectral band replication at the decoder, whereby the invention exploits new concepts of signal redundancy in the spectral domain.

BACKGROUND OF THE INVENTION

Audio source coding techniques can be divided into two classes: natural audio coding and speech coding. Natural audio coding is commonly used for music or arbitrary signals at medium bitrates, and generally offers wide audio bandwidth. Speech coders are basically limited to speech reproduction but can on the other hand be used at very low bitrates, albeit with low audio bandwidth. Wideband speech offers a major subjective quality improvement over narrow band speech. Increasing the bandwidth not only improves intelligibility and naturalness of speech, but also facilitates speaker recognition. Wideband speech coding is thus an important issue in next generation telephone systems. Further, due to the tremendous growth of the multimedia field, transmission of music and other non-speech signals at high quality over telephone systems is a desirable feature.

A high-fidelity linear PCM signal is very inefficient in terms of bitrate versus the perceptual entropy. The CD standard dictates 44.1 kHz sampling frequency, 16 bits per sample resolution and stereo. This equals a bitrate of 1411 kbit/s. To drastically reduce the bitrate, source coding can be performed using split-band perceptual audio codecs. These natural audio codecs exploit perceptual irrelevancy and statistical redundancy in the signal. Using the best codec technology, approximately 90% data reduction can be achieved for a standard CD-format signal with practically no perceptible degradation. Very high sound quality in stereo is thus possible at around 96 kbit/s, i.e. a compression factor of approximately 15:1. Some perceptual codecs offer even higher compression ratios. To achieve this, it is common to reduce the sample-rate and thus the audio bandwidth. It is also common to decrease the number of quantization levels, allowing occasionally audible quantization distortion, and to employ degradation of the stereo field, through intensity coding. Excessive use of such methods results in annoying perceptual degradation. Current codec technology is near saturation and further progress in coding gain is not expected. In order to improve the coding performance further, a new approach is necessary.

The human voice and most musical instruments generate quasistationary signals that emerge from oscillating systems. According to Fourier theory, any periodic signal may be expressed as a sum of sinusoids with the frequencies f, 2f, 3f, 4f, 5f etc. where f is the fundamental frequency. The frequencies form a harmonic series. A bandwidth limitation of such a signal is equivalent to a truncation of the harmonic series. Such a truncation alters the perceived timbre, tone colour, of a musical instrument or voice, and yields an audio signal that will sound "muffled" or "dull", and intelligibility may be reduced. The high frequencies are thus important for the subjective impression of sound quality.

Prior art methods are mainly intended for improvement of speech codec performance and in particular intended for High Frequency Regeneration (HFR), an issue in speech coding. Such methods employ broadband linear frequency shifts, non-linearities or aliasing [U.S. Pat. No. 5,127,0541] generating intermodulation products or other non-harmonic frequency components which cause severe dissonance when applied to music signals. Such dissonance is referred to in the speech coding literature as "harsh" and "rough" sounding. Other synthetic speech HFR methods generate sinusoidal harmonics that are based on fundamental pitch estimation and are thus limited to tonal stationary sounds [U.S. Pat. No. 4,771,465]. Such prior art methods, although useful for low-quality speech applications, do not work for high quality speech or music signals. A few methods attempt to improve the performance of high quality audio source codecs. One uses synthetic noise signals generated at the decoder to substitute noise-like signals in speech or music previously discarded by the encoder ["Improving Audio Codecs by Noise Substitution" D. Schultz, JAES, Vol. 44, No. 7/8, 1996]. This is performed within an otherwise normally transmitted highband at an intermittent basis when noise signals are present. Another method recreates some missing highband harmonics that were lost in the coding process ["Audio Spectral Coder" A. J. S. Ferreira, AES Preprint 4201, $100^{th}$ Convention, May 11-14 1996, Copenhagen] and is again dependent on tonal signals and pitch detection. Both methods operate at a low duty-cycle basis offering comparatively limited coding or performance gain.

SUMMARY OF THE INVENTION

The present invention provides a new method and an apparatus for substantial improvements of digital source coding systems and more specifically for the improvements of audio codecs. The objective includes bitrate reduction or improved perceptual quality or a combination thereof. The invention is based on new methods exploiting harmonic redundancy, offering the possibility to discard passbands of a signal prior to transmission or storage. No perceptual degradation is perceived if the decoder performs high quality spectral replication according to the invention. The discarded bits represent the coding gain at a fixed perceptual quality. Alternatively, more bits can be allocated for encoding of the lowband information at a fixed bitrate, thereby achieving a higher perceptual quality.

The present invention postulates that a truncated harmonic series can be extended based on the direct relation between lowband and highband spectral components. This extended series resembles the original in a perceptual sense if certain rules are followed: First, the extrapolated spectral components must be harmonically related to the truncated harmonic series, in order to avoid dissonance-related artifacts. The present invention uses transposition as a means for the spectral replication process, which ensures that this criterion is met. It is however not necessary that the lowband spectral components form a harmonic series for successful operation, since new replicated components, harmonically related to those of the lowband, will not alter the noise-like or transient nature of the signal. A transposition is defined as a transfer of partials from one position to another on the musical scale while maintaining the frequency ratios of the partials. Second, the spectral envelope, i.e. the coarse spectral distribution, of the replicated highband, must reasonably well resemble that of the original signal. The present invention offers two modes of operation, SBR-1 and SBR-2, that differ in the way the spectral envelope is adjusted.

SBR-1, intended for the improvement of intermediate quality codec applications, is a single-ended process which relies exclusively on the information contained in a received lowband or lowpass signal at the decoder. The spectral envelope of this signal is determined and extrapolated, for instance using polynomials together with a set of rules or a codebook. This information is used to continuously adjust and equalise the replicated highband. The present SBR-1 method offers the advantage of post-processing, i.e. no modifications are needed at the encoder side. A broadcaster will gain in channel utilisation or will be able to offer improved perceptual quality or a combination of both. Existing bitstream syntax and standards can be used without modification.

SBR-2, intended for the improvement of high quality codec applications, is a double-ended process where, in addition to the transmitted lowband signal according to SBR-1, the spectral envelope of the highband is encoded and transmitted. Since the variations of the spectra envelope has a much lower rate than the highband signal components, only a limited amount of information needs to be transmitted in order to successfully represent the spectral envelope. SBR-2 can be used to improve the performance of current codec technologies with no or minor modifications of existing syntax or protocols, and as a valuable tool for future codec development.

Both SBR-1 and SBR-2 can be used to replicate smaller passbands of the lowband when such bands are shut down by the encoder as stipulated by the psychoacoustic model under bit-starved conditions. This results in improvement of the perceptual quality by spectral replication within the lowband in addition to spectral replication outside the lowband. Further, SBR-1 and SBR-2 can also be used in codecs employing bitrate scalability, where the perceptual quality of the signal at the receiver varies depending on transmission channel conditions. This usually implies annoying variations of the audio bandwidth at the receiver. Under such conditions, the SBR methods can be used successfully in order to maintain a constantly high bandwidth, again improving the perceptual quality.

The present invention operates on a continuous basis, replicating any type of signal contents, i.e. tonal or non-tonal (noise-like and transient signals). In addition, the present spectral replication method creates a perceptually accurate replica of the discarded bands from available frequency bands at the decoder. Hence, the SBR method offers a substantially higher level of coding gain or perceptual quality improvement compared to prior art methods. The invention can be combined with such prior art codec improvement methods; however, no performance gain is expected due to such combinations.

The SBR-method comprises the following steps:
encoding of a signal derived from an original signal, where frequency bands of the signal are discarded and the discarding is performed prior to or during encoding, forming a first signal,
during or after decoding of the first signal, transposing frequency bands of the first signal, forming a second signal,
performing spectral envelope adjustment, and
combining the decoded signal and the second signal, forming an output signal.

The passbands of the second signal may be set not to overlap or partly overlap the passbands of the first signal, and may be set in dependence of the temporal characteristics of the original signal and/or the first signal, or transmission channel conditions. The spectral envelope adjustment is performed based on estimation of the original spectral envelope from said first signal or on transmitted envelope information of the original signal.

The present invention includes to basic types of transposers: multiband transposers and time-variant pattern search prediction transposers, having different properties. A basic multiband transposition may be performed according to the present invention by the following:
filtering the signal to be transposed through a set of $N \geq 2$ bandpass filters with passbands comprising the frequencies $[f_1, \ldots, f_N]$ respectively, forming N bandpass signals,
shifting the bandpass signals in frequency to regions comprising the frequencies $M [f_1, \ldots, f_N]$ where $M \neq 1$ is the transposition factor, and
combining the shifted bandpass signals, forming the transposed signal.

Alternatively, this basic multiband transposition may be performed according to the invention by the following:
bandpass filter the signal to be transposed signal using an analysis filterbank or transform of such a nature that real- or complex-valued subband signals of lowpass type are generated,
an arbitrary number of channels k of said analysis filterbank or transposers are connected to channels Mk, $M \neq 1$, in a synthesis filterbank or transform, and
the transposed signal is formed using the synthesis filterbank or transform.

An improved multiband transposition according to the invention incorporates phase adjustments, enhancing the performance of the basic multiband transposition.

The time-variant pattern search prediction disposition according to the present invention may be performed by the following:
performing transient detection on the first signal,
determine which segment of the first signal to be used when duplicating/discarding parts of the first signal depending on the outcome of the transient detection,
adjusting statevector and codebook properties depending on the outcome of the transient detection, and
searching for synchronisation points in chosen segment of the first signal, based on the synchronisation point found in the previous synchronisation point search.

The SBR methods and apparatuses according to the present invention offer the following features:
1. The methods and apparatuses exploit new concepts of signal redundancy in the spectral domain.
2. The methods and apparatuses are applicable on arbitrary signals.
3. Each harmonic set is individually created and controlled.

4. All replicated harmonics are generated in such a manner as to form a continuation of the existing harmonic series.
5. The spectral replication process is based on transposition and creates no or imperceptible artifacts.
6. The spectral replication can cover multiple smaller bands and/or a wide frequency range.
7. In the SBR-1 method, the processing is performed at the decoder side only, i.e. all standards and protocols can be used without modification.
8. The SBR-2 method can be implemented in accordance with most standards and protocols with no or minor modifications.
9. The SBR-2 method offers the codec designer a new powerful compression tool.
10. The coding gain is significant.

The most attractive application relates to the improvement of various types of low bitrate codecs, such as MPEG 1/2 Layer I/II/III [U.S. Pat. No. 5,040,217], MPEG 2/4 AAC, Dolby AC-2/3, NTT TwinVQ [U.S. Pat. No. 5,684,920], AT&T/Lucent PAC etc. The invention is also useful in high-quality speech codecs such as wideband CELP and SB-ADPCM G.722 etc. to improve perceived quality. The above codecs are widely used in multimedia, in the telephone industry, on the Internet as well as in professional applications. T-DAB (Terrestrial Digital Audio Broadcasting) systems use low bitrate protocols that will gain in channel utilsation by using the present method, or improve quality in FM and AM DAB. Satellite S-DAB will gain considerably, due to the excessive system costs involved, by using the present method to increase the number of programme channels in the DAB multiplex. Furthermore, for the first time, full bandwidth audio real-time streaming over the Internet is achievable using low bitrate telephone modems.

BRIEF DESCRIPTION OF THE DRAWINGS

The present invention will now be described by way of illustrative examples, not limiting the scope or spirit of the invention, with reference to the accompanying drawings, in which.

DESCRIPTION OF PREFERRED EMBODIMENTS

Throughout the explanation of the embodiments herein, emphasis is given to natural audio source coding applications. However, it should be understood that the present invention is applicable on a range of source coding applications other than that of encoding and decoding audio signals.

Transposition Basics

Transposition as defined according to the present invention, is the ideal method for spectral replication, and has several major advantages over prior art, such as: no pitch detection is required, equally high performance for single-pitched and polyphonic programme material is obtained, and the transposition works equally well for tonal and non-tonal signals. Contrary to other methods, the transposition according to the invention can be used in arbitrary audio source coding systems for arbitrary signal types.

An exact transposition a factor M of a discrete time signal x(n) in the form of a sum of cosines with time varying amplitudes, is defined by the relation $$x(n) = \sum_{i=0}^{N-1} e_i(n)\cos(2\pi f_i n/f_s + \alpha_i) \rightarrow \quad (1)$$

$$y(n) = \sum_{i=0}^{N-1} e_i(n)\cos(2\pi M f_i n/f_s + \beta_i) \quad (2)$$

where N is the number of sinusoids, hereafter referred to as partials, $f_i$, $e_i(n)$, $\alpha_i$ are the individual input frequencies, time envelopes and phase constants respectively, $\beta_i$ are the arbitrary output phase constants and $f_s$ is the sampling frequency, and $0 \leq Mf_i \leq f_s/2$.

Figure 1:
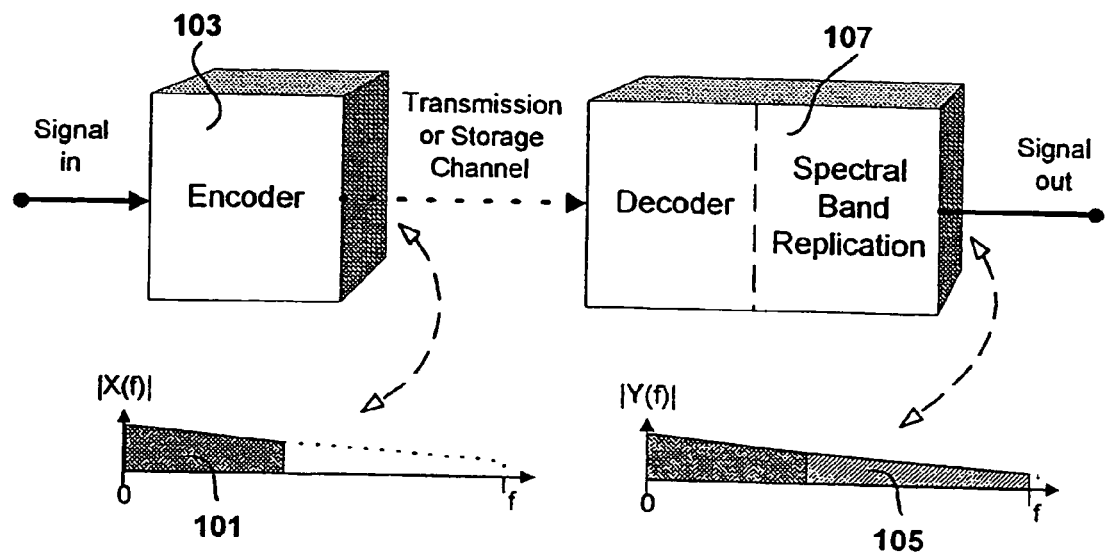
FIG. 1 illustrates SBR incorporated in a coding system according to the present invention.
Figure 2:
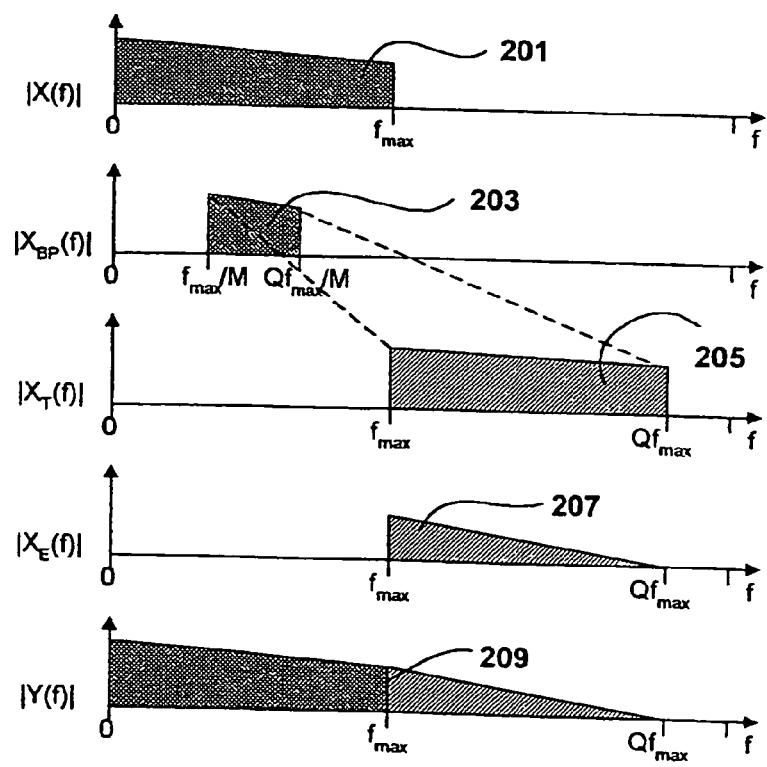
FIG. 2 illustrates spectral replication of upper harmonics according to the present invention.
Figure 3:
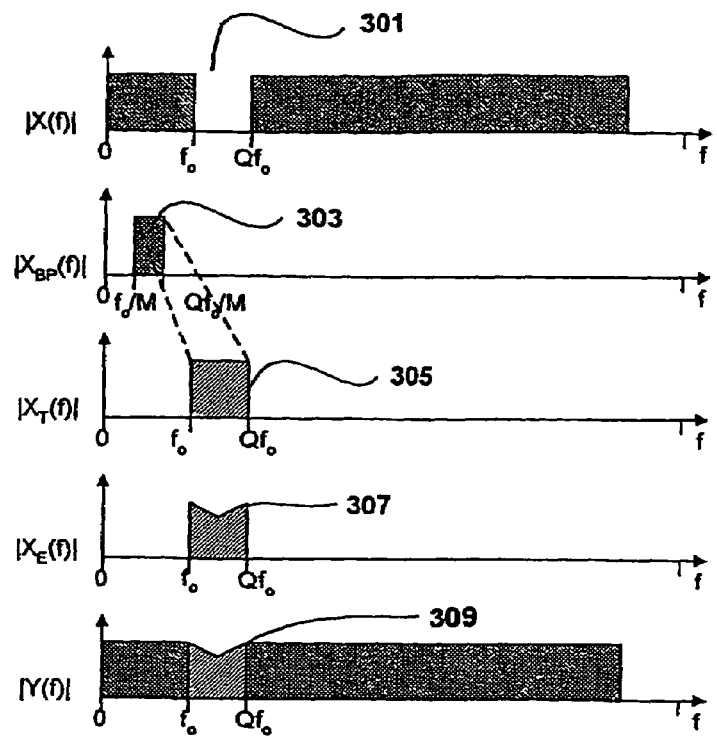
FIG. 3 illustrates spectral replication of inband harmonics according to the present invention.

In FIG. 2, the generation of $M^{th}$ order harmonics, where M is an integer $\geq 2$, is shown. The term $M^{th}$ order harmonics is used for simplicity, albeit the process generates $M^{th}$ order harmonics to all signals in a certain frequency region, which in most cases are themselves harmonics of unknown order. The input signal with the frequency domain representation X(f) is bandlimited to the range 0 to $f_{max}$, 201. The signal contents in the range $f_{max}/M$ to $Qf_{max}/M$, where Q is the desired bandwidth expansion factor $1 < Q \leq M$, is extracted by means of a bandpass filter, forming a bandpass signal with spectrum $X_{BP}(f)$ 203. The bandpass signal is transposed a factor M, forming a second bandpass signal with spectrum $X_T(f)$ covering the range $f_{max}$ to $Qf_{max}$, 205. The spectral envelope of this signal is adjusted by means of a programme-controlled equaliser, forming a signal with spectrum $X_E(f)$ 207. This signal is then combined with a delayed version of the input signal in order to compensate for the delay imposed by the bandpass filter and transposer, whereby an output signal with spectrum Y(f) covering the range 0 to $Qf_{max}$, is formed 209. Alternatively, bandpass filtering may be performed after the transposition M, using cut-off frequencies $f_{max}$ and $Qf_{max}$. By using multiple transposers, simultaneous generation of different harmonic orders is of course possible. The above scheme may also be used to "fill in" stopbands within the input signal, as shown in FIG. 3, where the input signal has a stopband extending from $f_0$ to $Qf_0$ 301. A passband $[f_0/M, Qf_0/M]$ is then extracted 303, transposed a factor M to $[f_0, Qf_0]$ 305, envelope adjusted 307 and combined with the delayed input signal forming the output signal with spectrum Y(f) 309.

An approximation of an exact transposition may be used. According to the present invention, the quality of such approximations is determined using dissonance theory. A criterion for dissonance is presented by Plomp ["Tonal Consonance and Critical Bandwidth" R. Plomp, W. J. M. Levelt JASA, Vol 38, 1965], and states that two partials are considered dissonant if the frequency difference is within approximately 5 to 50% of the bandwidth of the critical band in which the partials are situated. For reference, the critical bandwidth for a given frequency can be approximated by $$cb(f) = 25 + 75\left(1 + 1.4\left(\frac{f}{1000}\right)^2\right)^{0.69} \quad (3)$$

with f and cb in Hz. Further, Plomp states that the human auditory system can not discriminate two partials if they differ in frequency by approximately less than five percent of the critical bandwidth in which they are situated. The exact transposition in Eq. 2 is approximated by $$y_{approx}(n) = \sum_{i=0}^{N-1} e_i(n)\cos(2\pi(Mf_i \pm \Delta f_i)n/f_x + \beta_i), \quad (4)$$

where $\Delta f_i$ is the deviation from the exact transposition. If the input partials form a harmonic series, a hypothesis of the invention states that the deviations from the harmonic series of the transposed partials must not exceed five percent of the critical bandwidth in which they are situated. This would explain why prior art methods give unsatisfactory "harsh" and "rough" results, since broad band linear frequency shifts yields a much larger deviation than acceptable. When prior art methods produce more than one partial for only one input partial, the partials must nevertheless be within the above stated deviation limit, as to be perceived as one partial. This again explains the poor results obtained with prior art methods using nonlinearities etc, since they produce intermodulation partials not within the limit of deviation.

When using the above transposition based method of spectral replication according to the present invention, the following important properties are achieved:

Normally, no frequency domain overlap occur between replicated harmonics and existing partials.

The replicated partials are harmonically related to the partials of the input signal and will not give rise to any annoying dissonance or artifacts.

The spectral envelope of the replicated harmonics forms a smooth continuation of the input signal spectral envelope, perceptually matching the original envelope.

Transposition Based on Time-variant Pattern Search Prediction

Various ways to design the required transposers exist. Typical time-domain implementations expand the signal in time by duplicating signal segments based on the pitch-period. This signal is subsequently read out at a different rate. Unfortunately such methods are strictly dependent on pitch-detection for accurate time splicing of the signal segments. Furthermore, the constraint to work on pitch-period based signal segments makes them sensitive to transients. Since the detected pitch-period can be much longer than the actual transient, the risk of duplicating the entire transient rather than just expanding it in time is obvious. Another type of time domain algorithms obtains time expansion/compression of speech signals by utilising pattern search prediction of the output signal ["Pattern Search Prediction of Speech" R Bogner, T. Li, Proc. ICASSP '89, Vol. 1, May 1989, "Time-Scale Modification of Speech based on a nonlinear Oscillator Model" G. Kubin, W. B. Kleijn, IEEE, 1994]. This is a form of granular synthesis, where the input signal is divided into small parts, granules, used to synthesis the output signal. This synthesis is usually done by performing correlation of signal segments in order to determine the best splicing points. This means that the segments used to form the output signal are not dependent on the pitch period, and thus the non-trivial task of pitch detection is not required. Nevertheless, problems with rapidly changing signal amplitudes remain in these methods, and high quality transposition tends to raise high computational demands. However, an improved time-domain pitch shifter/transposer is now presented, where the use of transient detection and dynamic system parameters produces a more accurate transposition for high transposition factors during both stationary (tonal or non-tonal) and transient sounds, at a low computational cost.

Figure 4:
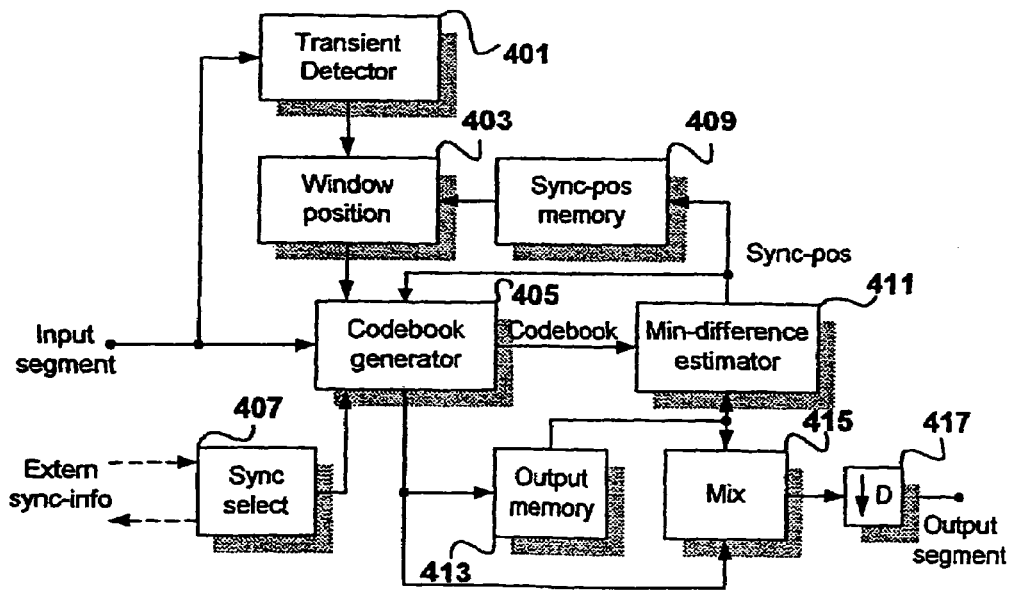
FIG. 4 is a block diagram for a time-domain implementation of a transposer according to the present invention.

Referring to the drawings wherein like numerals indicate like elements, there is shown in FIG. 4 nine separate modules: a transient-detector 401, a window position adjuster 403, a codebook generator 405, a synchronisation signal selector 407, a synchronisation position memory 409, a minimum difference estimator 411, an output segment memory 413, a mix unit 415, and a down sampler 417. The input signal is fed to both the codebook generator 405 and the transient-detector 401. If a transient is detected, its position is sent to the window position module 403. This module stipulates the size and position of the window that is multiplied with the input signal when creating the codebook. The codebook generator 405 receives a synchronisation position from the sync select module 407, provided it has been connected to another transposer. If this synchronisation position is within the codebook, it is used and an output segment is produced. Otherwise the codebook is sent to the minimum difference estimator 411 which returns a new synchronisation position. The new output segment is windowed together with the previous output segment in the mix module 415 and subsequently down sampled in module 417.

In order to clarify the explanation, a state space representation is introduced. Here, the state vectors, or granules, represent the input and output signals. The input signal is represented by a statevector x(n):

$$x(n)=[x(n),x(n-D),x(n-2D),\ldots,x(n-(N-1)D)] \quad (5)$$

which is obtained from N delayed samples of the input signal, where N is the dimension of the state vector and D is the delay between the input samples used to build the vector. The granular mapping yields the sample x(n) following each statevector x(n−1). This gives Eq. 6, where a(.) is the mapping:

$$x(n)=a(x(n-1)). \quad (6)$$

In the present method the granular mapping is used to determine the next output based on the former output, using a state transition codebook. The codebook of length L is continuously rebuilt containing the statevectors and the next sample following each statevector. Each statevector is separated from its neighbour by K samples; this enables the system to adjust the time resolution depending on the characteristics of the currently processed signal, where K equal to one represents the finest resolution. The input signal segment used to build the codebook is chosen based on the position of a possible transient and the synchronisation position in the previous codebook.

This means that the mapping a(.), theoretically, is evaluated for all transitions included in the codebook:

$$a\left(\begin{bmatrix} x(n-L) \\ x(n-L+K) \\ \vdots \\ x(n-1) \end{bmatrix}\right) = \begin{bmatrix} x(n-L+1) \\ x(n-L+K+1) \\ \vdots \\ x(n) \end{bmatrix}. \quad (7)$$

With this transition codebook, the new output y(n) is calculated by searching for the statevector in the codebook most similar to the current statevector y(n−1). This nearest-neighbour search is done by calculating the minimum difference and gives the new output sample:

$$y(n)=a(y(n-1)). \quad (8)$$

However, the system is not limited to work on a sample by sample basis, but is preferably operated on a segment by segment basis. The new output segment is windowed and added, mixed, with the previous output segment, and subsequently down sampled. The pitch transposition factor is determined by the ratio of the input segment length represented by the codebook and the output segment length read out of the codebook.

Figure 5:
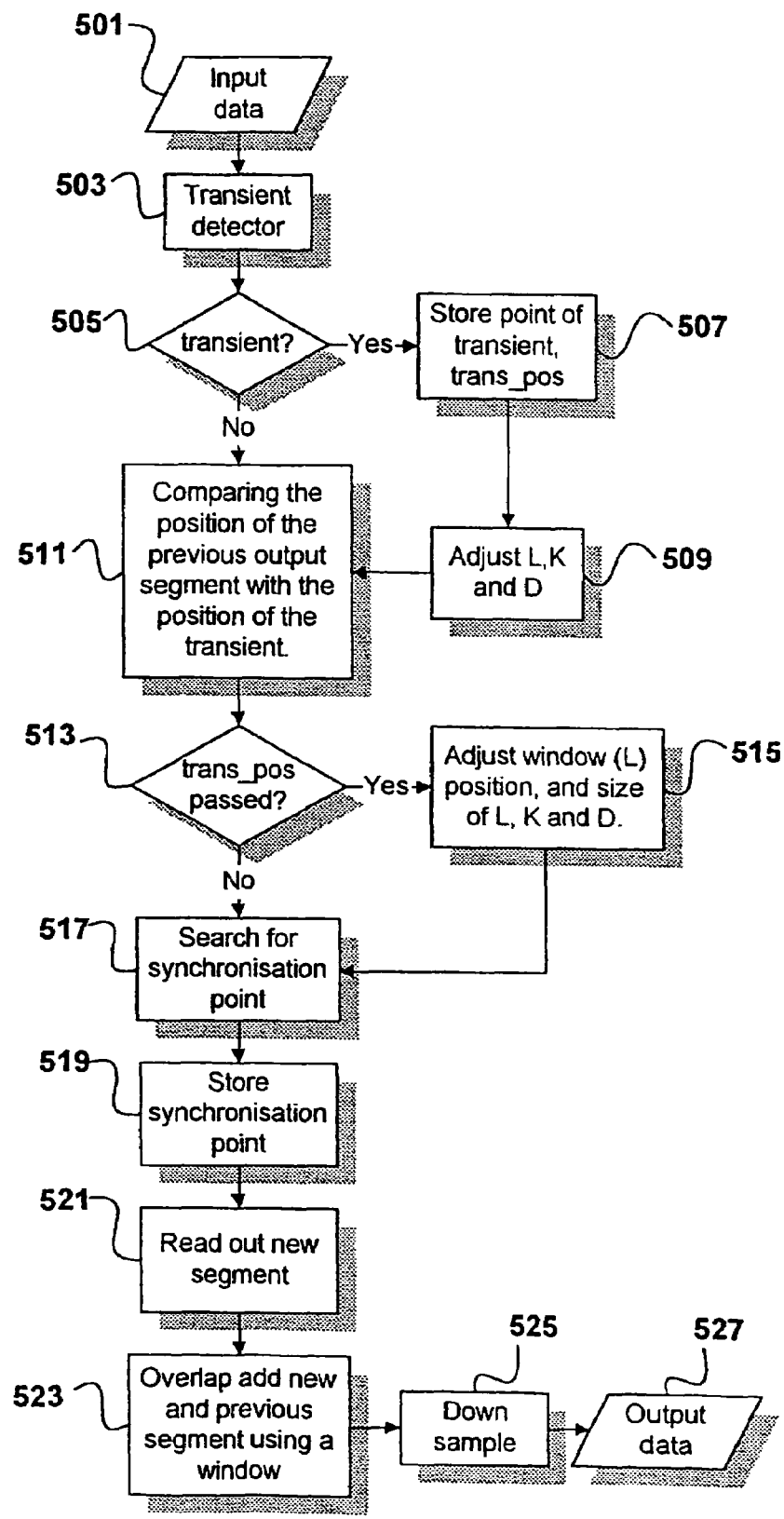
FIG. 5 is a flow-chart representing a cycle of operation for the pattern search prediction transposer according to the present invention.
Figure 6:
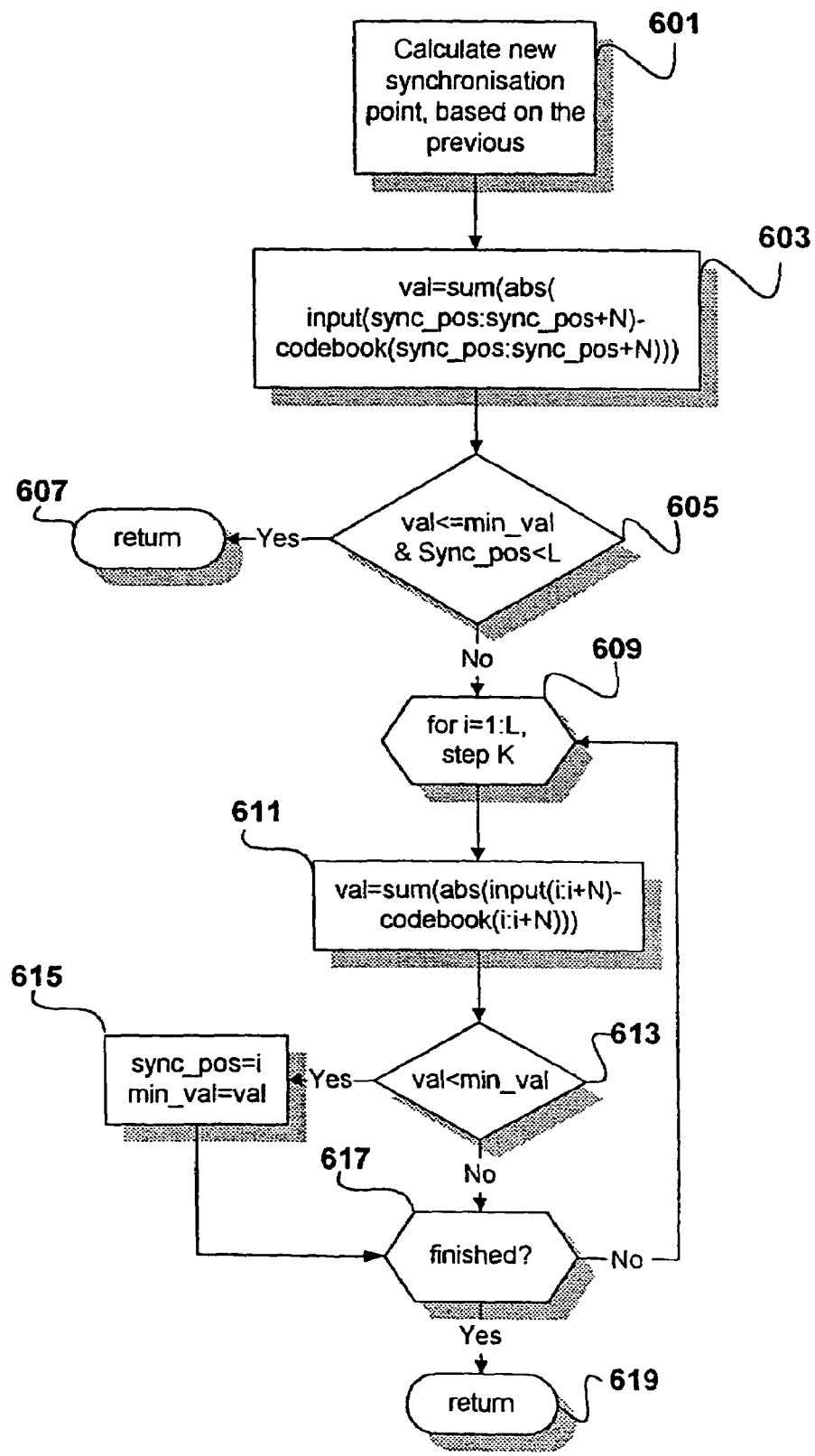
FIG. 6 is a flow-chart representing the search for synchronisation point according to the present invention.

Returning to the drawings, in FIG. 5 and FIG. 6 flow-charts are presented, displaying the cycle of operation of the transposer. In 501 the input data is represented, a transient detection 503 is performed on a segment of the input signal; the search for transients is performed on a segment length equal to the output segment length. If a transient is found 505, the position of the transient is stored 507 and the parameters L (representing the codebook length), K (representing the distance in samples between each statevector), and D (representing the delay between samples in each statevector) are adjusted 509. The position of the transient is compared to the position of the previous output segment 511, in order to determine whether the transient has been processed. If so 513, the position of the codebook (window L), and the parameters K, L, and D are adjusted 515. After the necessary parameter adjustments, based on the outcome of the transient detection, the search for a new synchronisation, or splicing point takes place 517. This procedure is displayed in FIG. 6. First a new synchronisation point is calculated based on the previous 601, according to:

$$\text{Sync\_pos}=\text{Sync\_pos\_old}+S\cdot M-S, \quad (9)$$

where Sync_pos and Sync_pos_old are the new and old synchronisation positions respectively, S is the length of the input segment being processed, and M is the transposition factor. This synchronisation point is used to compare the accuracy of the new splicing point with the accuracy of the old splicing point 603. If the match is as good as or better than the previous 605, this new synchronisation point is returned 607 provided it is within the codebook. If not, a new synchronisation point is searched for in the loop 609. This is performed with a similarity measure, in this case a minimum difference function 611, however, it is also possible to use correlation in the time- or frequency-domain. If the position yields a better match than that of the previous position found 613 the synchronisation position is stored 615. When all positions are tried 617 the system returns 619 to the flowchart in FIG. 5. The new synchronisation point obtained is stored 519 and a new segment is read out from the codebook 521 starting at the given synchronisation point. This segment is windowed and added to the previous 523, down sampled by the transposition factor 525, and stored in the output buffer 527.

Figure 7A:
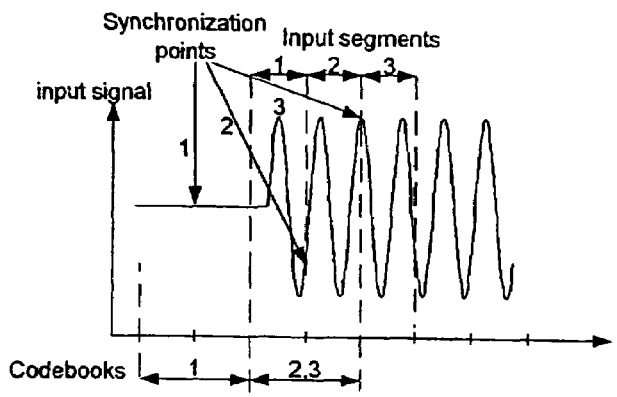
FIG. 7a-7b illustrates the codebook positioning during transients according to the present invention.
Figure 7B:
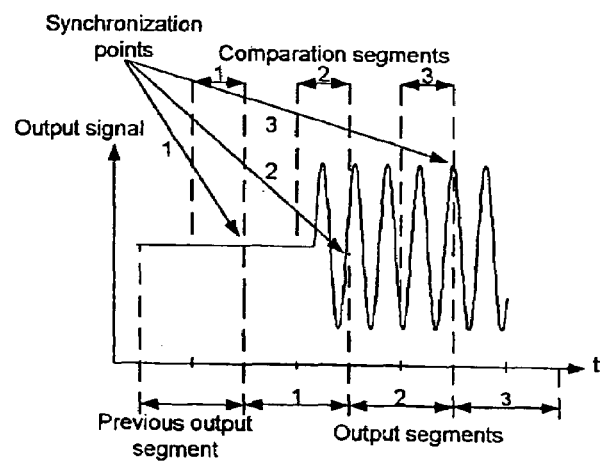

In FIG. 7 the behaviour of the system under transient conditions regarding the position of the codebook is illustrated. Prior to the transient, the codebook 1 representing the input segment 1 is positioned "to the left" of segment 1. Correlation segment 1 represents a part of the previous output and is used to find synchronisation point 1 in codebook 1. When the transient is detected, and the point of the transient is processed, the codebook is moved according to FIG. 7a and is stationary until the input segment currently being processed is once again "to the right" of the codebook. This makes it impossible to duplicate the transient since the system is not allowed to search for synchronisation points prior to the transient.

Most pitch transposers, or time expanders, based on pattern search prediction give satisfactory results for speech and single-pitched material. However, their performance deteriorates rapidly for high complexity signals, like music, in particular at large transposition factors. The present invention offers several solutions for improved performance, therefore producing excellent results for any type of signal. Contrary to other designs, the system is time-variant and the system parameters are based on the properties of the input signal, and the parameters used during the previous operation cycle. The use of a transient detector controlling not only the codebook size and position, but also the properties of the statevectors included, is a very robust and computationally efficient method to avoid audible degradation during rapidly changing signal segments Furthermore, alteration of the length of the signal segment being processed, which would raise higher computational demands, is not required. Also, the present invention utilises a refined codebook search based on the results from the preceding search. This means that contrary to an ordinary correlation of two signal segments, as is usually done in time-domain systems based on pattern search prediction, the most likely synchronisation positions are tried first instead of trying all positions consecutively. This new method for reducing the codebook search drastically reduces the computational complexity of the system. Further, when using several transposers, synchronisation position information can be shared among the transposers for further reduction of the computational complexity, as shown in the following implementation.

Figure 8:
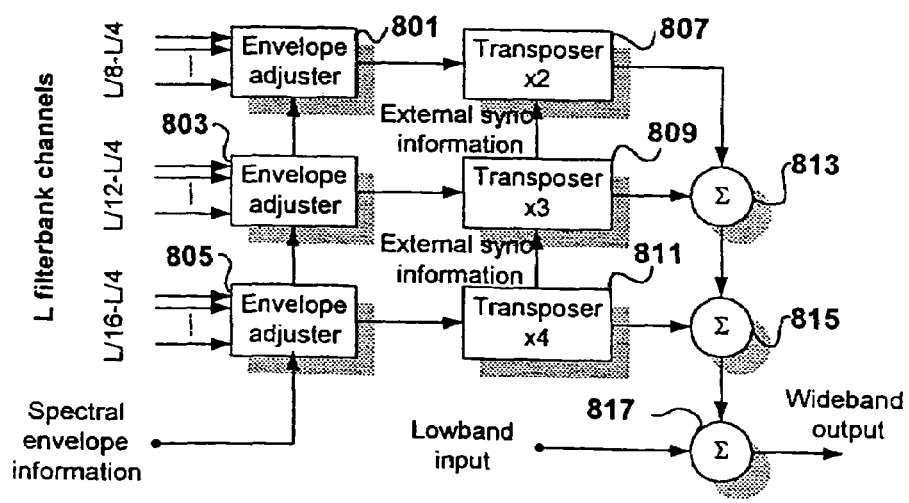
FIG. 8 is a block diagram for an implementation of several time-domain transposers in connection with a suitable filterbank, for SBR operation according to the present invention.

The time-domain transposers as explained above are used to implement the SBR-1 and SBR-2 systems according to the following, illustrative but not limiting, example. In FIG. 8 three time expansion modules are used in order to generate second, third and fourth order harmonics. Since, in this example, each time domain expansion/transposer works on a wideband signal, it is beneficial to adjust the spectral envelope of the source frequency range prior to transposition, considering that there will be no means to do so after the transpositions, without adding a separate equaliser system. The spectral envelope adjusters, 801, 803 and 805, each work on several filterbank channels. The gain of each channel in the envelope adjusters must be set so that the sum, 813, 815, 817, at the output, after transposition, yields the desired spectral envelope. The transposers 807, 809 and 811 are interconnected in order to share synchronisation position information. This is based on the fact that under certain conditions, a high correlation will occur between the synchronisation positions found in the codebook during correlation in the separate transposing units. Assume, as an example and again not limiting the scope of the invention, the fourth order harmonic transposer works on a time frame basis half of that of the second order harmonic transposer but at twice the duty cycle. Assume further, that the codebooks used for the two expanders are the same and that the synchronisation positions of the two time-domain expanders are labelled sync_pos4 and sync_pos2, respectively. This yields the following relation:

sync_pos2=sync_pos4−n·4·S−sync_offset, for n=1,2, 3,4, . . . , (10)

where sync_offset=sync_pos4−sync_pos2, for n=0, (11)

and S is the length of the input segment represented by the codebook. This is valid as long as neither of the synchronisation position pointers reaches the end of the codebook. During normal operation n is increased by one for each time-frame processed by the second order harmonic transposer, and when the codebook end inevitably is reached, by either of the pointers, the counter n is set to n=0, and sync_pos2 and sync_pos4 are computed individually. Similar results are obtained for the third order harmonic transposer when connected to the fourth order harmonic transposer.

The above-presented use of several interconnected time-domain transposers, for the creation of higher order harmonics, introduces substantial computational reduction. Furthermore, the proposed use of time-domain transposers in connection with a suitable filterbank, presents the opportunity to adjust the envelope of the created spectrum while maintaining the simplicity and low computational cost of a time domain transposer, since these, more or less, may be implemented using fixed point arithmetic and solely additive/subtractive-operations.

Other, illustrative but not limiting, examples of the present invention are:

the use of a time domain transposer within each subband in a subband filter bank, thus reducing the signal complexity for each transposer.

the use of a time domain transposer in combination with a frequency domain transposer, thus enabling the system to use different methods for transposition depending on the characteristics of the input signal being processed.

the use of a time domain transposer in a wideband speech codec, operating on for instance the residual signal obtained after linear prediction.

It should be recognised that the method outlined above may be advantageously used for timescale modification only, by simply omitting the sample rate conversion. Further it is understood, that although the outlined method focuses on pitch transposing to a higher pitch, i.e. time expansion, the same principles apply when transposing to a lower pitch, i.e. time compression, as is obvious to those skilled in the art.

Filter Bank Based Transposition

Various new and innovative filter bank based transposition techniques will now be described. The signal to be transposed is divided into a series of BP- or subband signals. The subband signals are then transposed, exact or approximately, which is advantageously accomplished by a reconnection of analysis- and synthesis subbands, hereinafter referred to as a "patch". The method is first demonstrated using a Short Time Fourier Transform, STFT.

The N-point STFT of a discrete-time signal x(n) is defined by $$X_k(n) = \sum_{p=-\infty}^{\infty} x(p)h(n-p)e^{-j\omega_k p}, \quad (12)$$

where k=0,1, . . . , N−1 and $\omega_k=2\pi k/N$ and h(n) is a window. If the window satisfies the following conditions $$\begin{cases} h(0) = 1 \\ h(n) = 0 \text{ for } n \pm N, \pm 2N, \pm 3N, \ldots \end{cases} \quad (13)$$

an inverse transform exists and is given by $$x(n) = \frac{1}{N}\sum_{k=0}^{N-1} X_k(n)e^{j\omega_k n}. \quad (14)$$

Figure 9A:
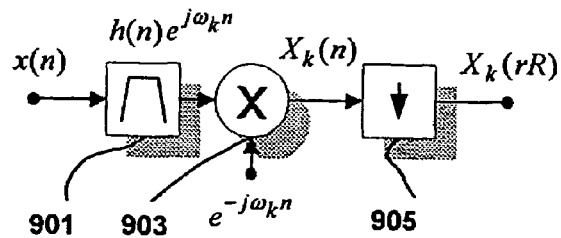
FIG. 9a-9c are block diagrams representing a device for STFT analysis and synthesis configured for generation of $2^{nd}$ order harmonics according to the present invention.
Figure 9B:
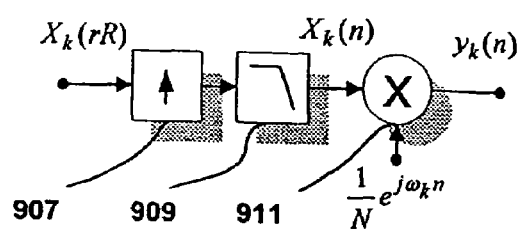

The direct transform may be interpreted as an analyser, see FIG. 9a, consisting of a bank of N BP-filters with impulse responses $h(n)\exp(j\omega_k n)$ 901 followed by a bank of N multipliers with carriers $\exp(-j\omega_k n)$ 903 which shift the BP-signals down to regions around 0 Hz, forming the N analysis signals $X_k(n)$. The window acts as a prototype LP-filter. $X_k(n)$ have small bandwidths and are normally downsampled 905. Eq. 12 need thus only be evaluated at n=rR, where R is the decimation factor and r is the new time variable. $X_k(n)$ can be recovered from $X_k(rR)$ by upsampling, see FIG. 9b, i.e. insertion of zeros 907 followed by LP-filtering 909. The inverse transform may be interpreted as a synthesiser consisting of a bank of N multipliers with carriers $(1/N)\exp(j\omega_k n)$ 911 that shift the signals $X_k(n)$ up to their original frequencies, followed by stages 913, FIG. 9c, that add the contributions $y_k(n)$ from all channels. The STFT and ISTFT may be rearranged in order to use the DFT and IDFT, which makes the use of FFT algorithms possible ["Implementation of the Phase Vocoder using the Fast Fourier Transform" M. R. Portnoff, IEEE ASSP, Vol. 24, No. 3, 1976].

Figure 9C:
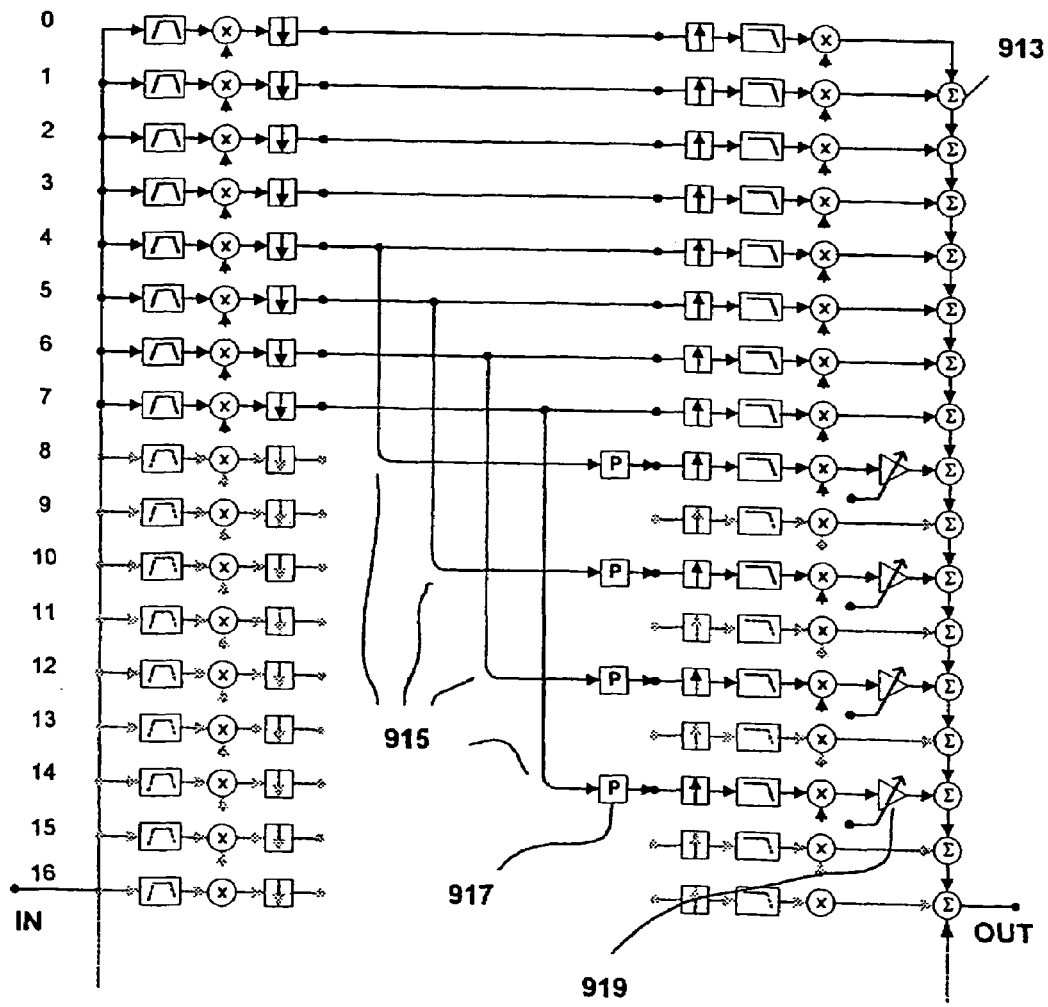
Figure 10A:
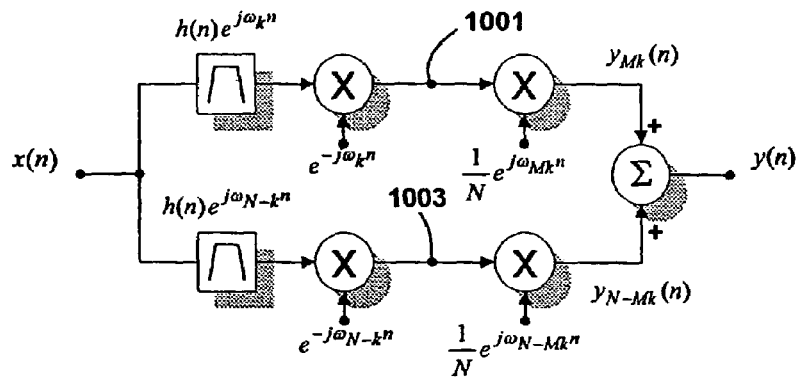
FIG. 10a-10b are block diagrams of one sub-band with a linear frequency shift in the STFT device according to the present invention.

FIG. 9c shows a patch 915 for generation of second harmonics, M=2, with N=32. For the sake of simplicity, only channels 0 through 16 are shown. The centre frequency of BP 16 equals the Nyqvist frequency, channels 17 through 31 correspond to negative frequencies. The blocks denoted P 917 and the gain blocks 919 will be described later and should presently be considered shorted out. The input signal is in this example bandlimited so that only channels 0 through 7 contain signals. Analyser channels 8 through 16 are thus empty and need not be mapped to the synthesiser. Analyser channels 0 through 7 are connected to synthesiser channels 0 through 7, corresponding to an input signal delay path. Analysis channels k where $4 \leq k \leq 7$ are also connected to synthesis channels Mk, M=2, which shift the signals to frequency regions at two times the centre-frequencies of BP filters k. Hence, the signals are upshifted to their original ranges as well as transposed one octave up. To explore the harmonic generation in terms of real-valued filter responses and modulators the negative frequencies must also be considered, see the lower branch of FIG. 10a. Hence, the combined output of the remapping k→Mk 1001 and N-k→N-Mk 1003 where $4 \leq k \leq 7$ must be evaluated.

Figure 10B:
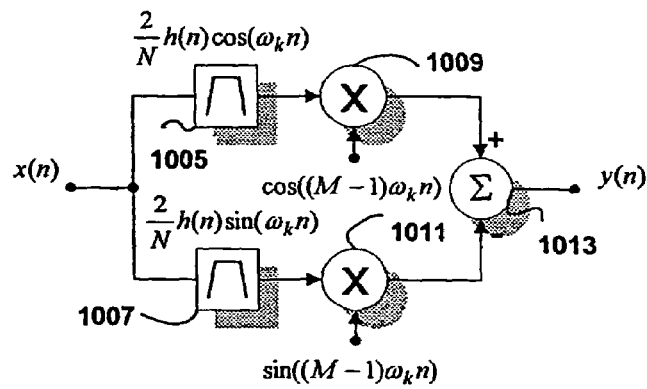

This yields $$y(n) = \frac{2}{N}\left[x(n) * h(n)\cos(\omega_k n)\right]\cos((M-1)\omega_k n)) + \quad (15)$$
$$- \frac{2}{N}\left[x(n) * h(n)\sin(\omega_k n)\right]\sin((M-1)\omega_k n)$$

where M=2. Eq. 15 may be interpreted as a BP-filtering of the input signal, followed by a linear frequency shift or Upper Side Band (USB) modulation, i.e. single side band modulation using the upper side band, see FIG. 10b, where 1005 and 1007 form a Hilbert transformer, 1009 and 1011 are multipliers with cosine and sine carriers and 1013 is a difference stage which selects the upper sideband. Clearly, such a multiband BP and SSB method may be implemented explicitly, i.e. without filterbank patching, in the time or frequency domain, allowing arbitrary selection of individual passbands and oscillator frequencies.

Figure 11:
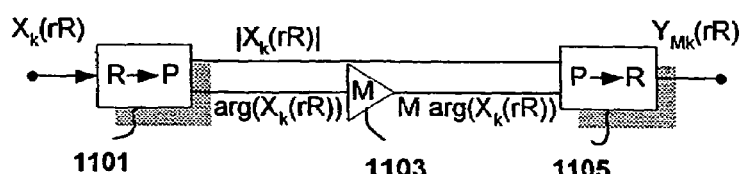
FIG. 11 shows one sub-band using a phase-multiplier according to the present invention.

According to Eq. 15, a sinusoid with the frequency $\omega_i$ within the passband of analysis channel k yields a harmonic at the frequency $M\omega_k+(\omega_i-\omega_k)$. Hence the method, referred to as basic multiband transposition, only generates exact harmonics for input signals with frequencies $\omega_i=\omega_k$, where $4 \leq k \leq 7$. However, if the number of filters is sufficiently large, the deviation from an exact transposition is negligible, see Eq. 4. Further, the transposition is made exact for quasi-stationary tonal signals of arbitrary frequencies by inserting the blocks denoted P 917 (FIG. 9c), provided every analysis channel contains maximum one partial In this case $X_k(rR)$ are complex exponentials with frequencies equal to the differences between the partial frequencies $\omega_i$ and the centre frequencies $\omega_k$ of the analysis filters. To obtain the exact transposition M, these frequencies must be increased by a factor M, modifying the above frequency relationship to $\omega_i \rightarrow M\omega_k+M(\omega_i-\omega_k)=M\omega_i$. The frequencies of $X_k(rR)$ are equal to the time derivatives of their respective unwrapped phase angles and may be estimated using first order differences of successive phase angles. The frequency estimates are multiplied by M and synthesis phase angles are calculated using those new frequencies. However, the same result, aside from a phase constant, is obtained in an simplified way by multiplying the analysis arguments by M directly, eliminating the need for frequency estimation. This is described in FIG. 11, representing the blocks 917. Thus $X_k(rR)$, where $4 \leq k \leq 7$ in this example, are converted from rectangular to polar coordinates, illustrated by the blocks R→P, 1101. The arguments are multiplied by M=2 1103 and the magnitudes are unaltered. The signals are then converted back to rectangular coordinates (P→R) 1105 forming the signals $Y_{Mk}(rR)$ and fed to synthesiser channels according to FIG. 9c. This improved multiband transposition method thus has two stages: The patch provides a coarse transposition, as in the basic method, and the phase-multipliers provide fine frequency corrections. The above multiband transposition methods differ from traditional pitch shifting techniques using the STFT, where lookup-table oscillators are used for the synthesis or, when the ISTFT is used for the synthesis the signal is time-stretched and decimated, i.e. no patch is used.

Figure 12:
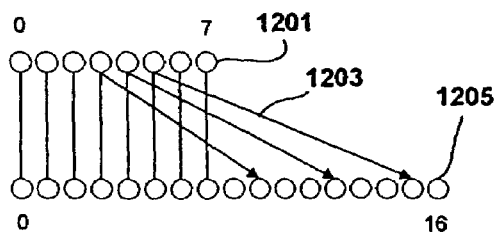
FIG. 12 illustrates how $3^{rd}$ order harmonics are generated according to the present invention.
Figure 13:
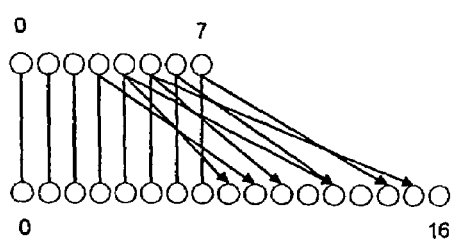
FIG. 13 illustrates how $2^{nd}$ and $3^{rd}$ order harmonics are generated simultaneously according to the present invention.
Figure 14:
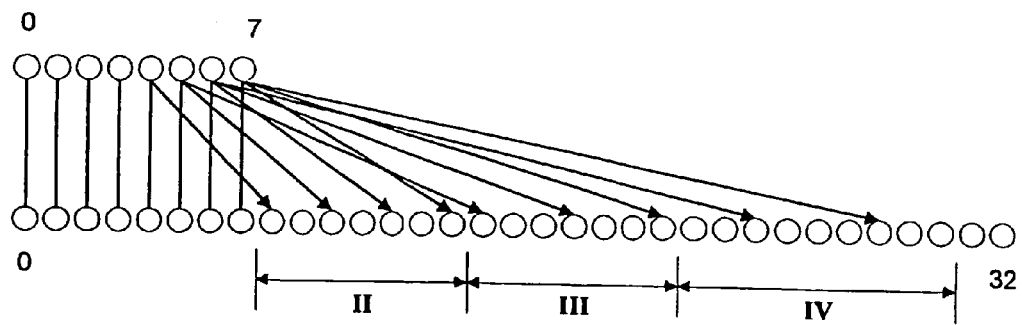
FIG. 14 illustrates generation of a non-overlapping combination of several harmonic orders according to the present invention.
Figure 15:
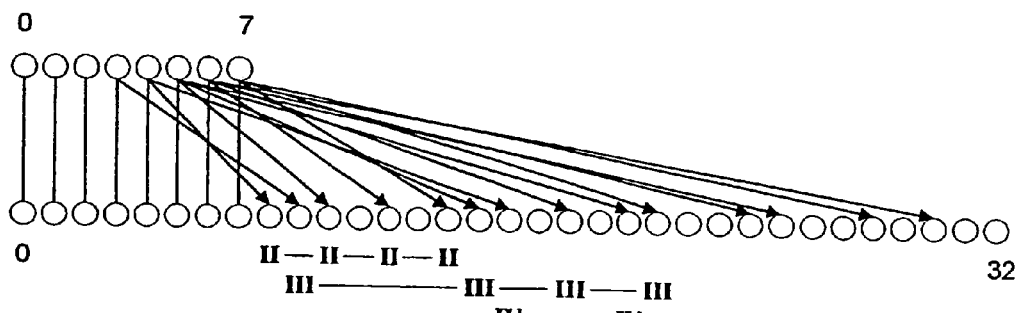
FIG. 15 illustrates generation of an interleaved combination of several harmonic orders according to the present invention.

The harmonic patch of FIG. 9c is easily modified for other transposition factors than two. FIG. 12 shows a patch 1203 for generation of $3^{rd}$ order harmonics, where 1201 are the analysis channels and 1205 are the synthesis channels. Different harmonic orders may be created simultaneously as shown in FIG. 13, where $2^{nd}$ and $3^{rd}$ order harmonics are used. FIG. 14 illustrates a non-overlapping combination of $2^{nd}$, $3^{rd}$ and $4^{th}$ order harmonics. The lowest possible harmonic number is used as high in frequency as possible. Above the upper limit of the destination range of harmonic M, harmonic M+1 is used. FIG. 15 demonstrates a method of mapping all synthesiser channels (N=64, channels 0-32 shown). All highband channels with non prime-number indices are mapped according to the following relation between source and destination channel number: $k_{dest}=Mk_{source}$ where M is the smallest integer $\geq 2$ that satisfies the condition that $k_{source}$ lies in the lowband and $k_{dest}$ in the highband. Hence, no synthesiser channel receives signal from more than one analysis channel. Prime-number highband channels may be mapped to $k_{source}=1$ or lowband channels $k_{source}>1$ that yield good approximations of the above relation (Only non-prime number connections with M=2, 3, 4, 5 are shown in FIG. 15).

Figure 16:
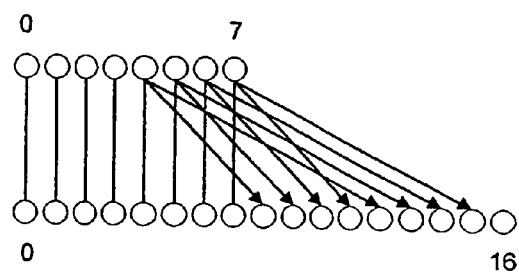
FIG. 16 illustrates generation of broadband linear frequency shifts.
Figure 17:
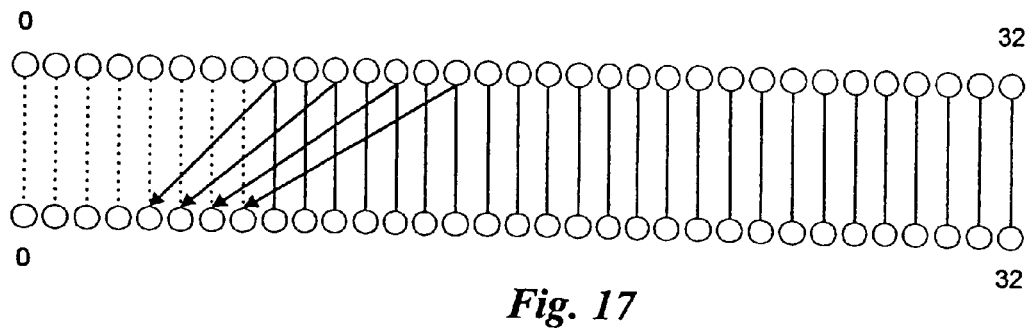
FIG. 17 illustrates how sub-harmonics are generated according to the present invention.

It is also possible to combine amplitude and phase information from different analyser channels. The amplitude signals $|X_k(rR)|$ may be connected according to FIG. 16, whereas the phase signals $\arg\{X_k(rR)\}$ are connected according to the principle of FIG. 15. In this way the lowband frequencies will still be transposed, whereby a periodic repetition of the source region envelope is generated instead of the stretched envelope that results from a transposition according to Eq. 2. Gating or other means may be incorporated in order to avoid amplification of "empty" source channels. FIG. 17 illustrates another application, the generation of sub-harmonics to a highpass filtered or bass limited signal by using connections from higher to lower subbands. When using the above transpositions it may be beneficial to employ adaptive switching of patch based on the characteristics of the signal.

In the above description it was assumed that the highest frequency contained in the input signal was significantly lower than the Nyqvist frequency. Thus, it was possible to perform a bandwidth expansion without an increase in sample rate. This is however not always the case, why a preceding upsampling may be necessary. When using filter bank methods for transposition, it is possible to integrate upsampling in the process.

Figure 18A:
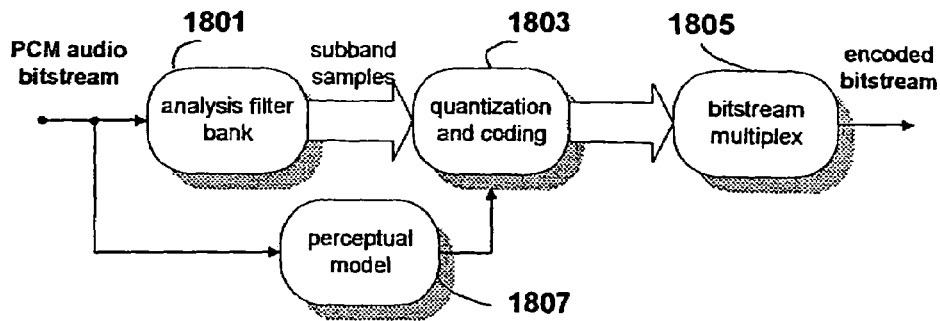
FIG. 18a-18b are block diagrams of a perceptual codec.
Figure 18B:
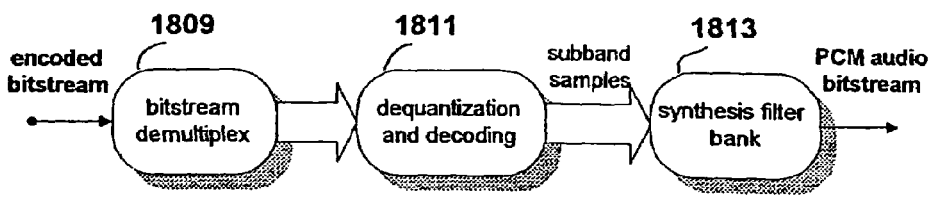

Most perceptual codecs employ maximally decimated filter banks in the time to frequency mapping ["Introduction to Perceptual Coding" K. Brandenburg, AES, Collected Papers on Digital Audio Bitrate Reduction, 1996]. FIG. 18a shows the basic structure of a perceptual encoder system. The analysis filter bank 1801 splits the input signal into several subband signals. The subband samples are individually quantised 1803, using a reduced number of bits, where the number of quantization levels are determined from a perceptual model 1807 which estimates the minimum masking threshold. The subband samples are normalised, coded with optional redundancy coding methods and combined with side information consisting of the normalisation factors, bit-allocation information and other codec specific data 1805, to form the serial bit stream. The bit stream is then stored or transmitted. In the decoder, FIG. 18b, the coded bitstream is demultiplexed 1809, decoded and the subband samples are re-quantised to the equal number of bits 1811. A synthesis filter bank combines the subband samples in order to recreate the original signal 1813. Implementations using maximally decimated filter banks will drastically reduce computational costs. In the following descriptions, there is a focus on cosine modulated filter banks. It should be appreciated however, that the invention can be implemented using other types of filter banks or transforms, including filter bank interpretations of the wavelet transform, other non-equal bandwidth filter banks or transforms and multi dimensional filter banks or transforms.

Figure 19:
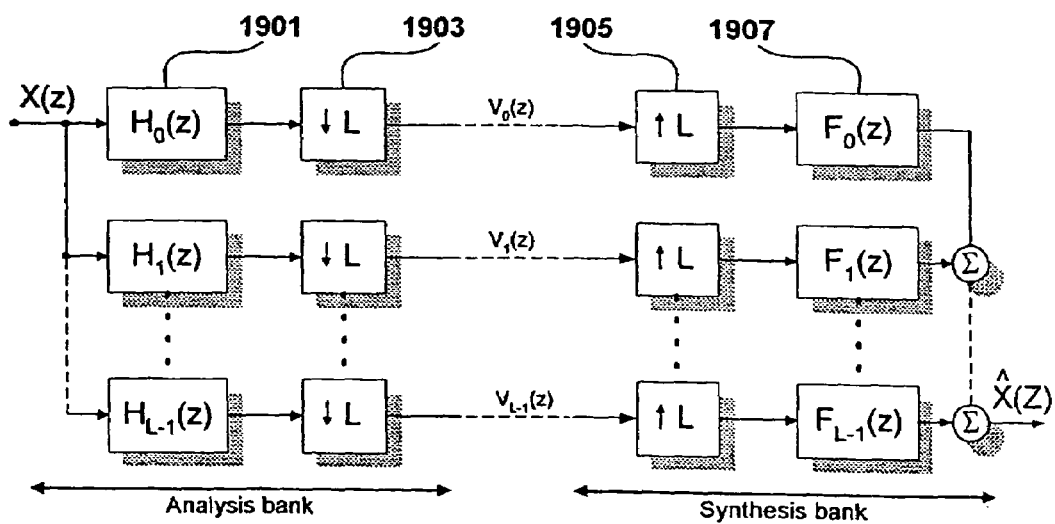
FIG. 19 shows a basic structure of a maximally decimated filterbank.

In the illustrative, but not limiting, descriptions below it is assumed that an L-channel cosine modulated filter bank splits the input signal x(n) into L subband signals. The generic structure of a minimally decimated filter bank is shown in FIG. 19. The analysis filters are denoted $H_k(z)$ 1901, where k=0, 1, ..., L−1. The subband signals $v_k(n)$ are maximally decimated 1903, each of sampling frequency $f_s/L$, where $f_s$ is the sampling frequency of x(n). The synthesis section reassembles the subband signals after interpolation 1905 and filtering 1907 to produce $\hat{x}(n)$. The synthesis filters are denoted $F_k(z)$. In addition, the present invention performs a spectral replication on $\hat{x}(n)$, giving an enhanced y(n).

Figure 20:
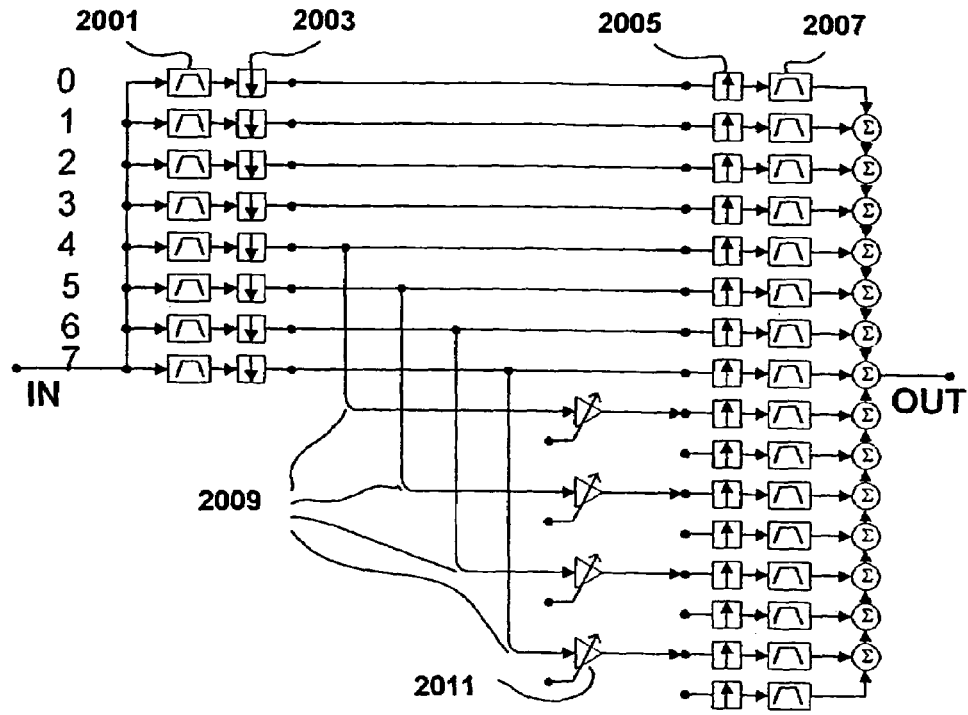
FIG. 20 illustrates generation of $2^{nd}$ order harmonics in a maximally decimated filterbank according to the present invention.

Synthesising the subband signals with a QL-channel filter bank, where only the L lowband channels are used and the bandwidth expansion factor Q is chosen so that QL is an integer value, will result in an output bit stream with sampling frequency $Qf_s$. Hence, the extended filter bank will act as if it is an L-channel filter bank followed by an upsampler. Since, in this case, the L(Q−1) highband filters are unused (fed with zeros), the audio bandwidth will not change—the filter bank will merely reconstruct an upsampled version of $\hat{x}(n)$. If, however, the L subband signals are patched to the highband filters, the bandwidth of $\hat{x}(n)$ will be increased by a factor Q, producing y(n). This is the maximally decimated filter bank version of the basic multiband transposer, according to the invention. Using this scheme, the upsampling process is integrated in the synthesis filtering as explained earlier. It should be noted that any size of the synthesis filter bank may be used, resulting in different sample-rates of the output signal, and hence different bandwidth expansion factors. Performing spectral replication on $\hat{x}(n)$ according to the present invention of the basic multiband transition method with an integer transposition factor M, is accomplished by patching the subband signals as $$v_{Mk}(n) = e_{Mk}(n)(-1)^{(M-1)kn} v_k(n), \quad (16)$$

where $k \in [0, L-1]$ and chosen so that $Mk \in [L, QL-1]$, $e_{Mk}(n)$ is the envelope correction and $(-1)^{(M-1)kn}$ is a correction factor for spectral inverted subband. Spectral inversion results from decimation of subband signals, and the inverted signals may be reinverted by changing sign on every second sample in those channels. Referring to FIG. 20, consider an 16-channel synthesis filter bank, patched 2009 for a transposition factor M=2, with Q=2. The blocks 2001 and 2003 denote the analysis filters $H_k(z)$ and the decimators of FIG. 19 respectively. Similarly, 2005 and 2007 are the interpolators and synthesis filters $F_k(z)$. Eq. 16 then simplifies to patching of the four upper frequency subband signals of the received data into every second of the eight uppermost channels in the synthesis filter bank. Due to spectral inversion, every second patched subband signal must be frequency inverted before the synthesis. Additionally, the magnitudes of the patched signals must be adjusted 2011 according to the principles of SBR-1 or SBR-2.

Using the basic multiband transposition method according to the present invention, the generated harmonics are in general not exact multiples of the fundamentals. All frequencies but the lowest in every subband differs in some extent from an exact transposition. Further, the replicated spectrum contains zeros since the target interval covers a wider frequency range than the source interval. Moreover, the alias cancellation properties of the cosine modulated filter bank vanishes, since the subband signals are separated in frequency in the target interval. That is, neighbouring subband signals do not overlap in the high-band area. However, aliasing reduction methods, known by those skilled in the art, may be used to reduce this type of artifacts. Advantages of this transposition method are ease of implementation, and the very low computational cost.

Figure 21:
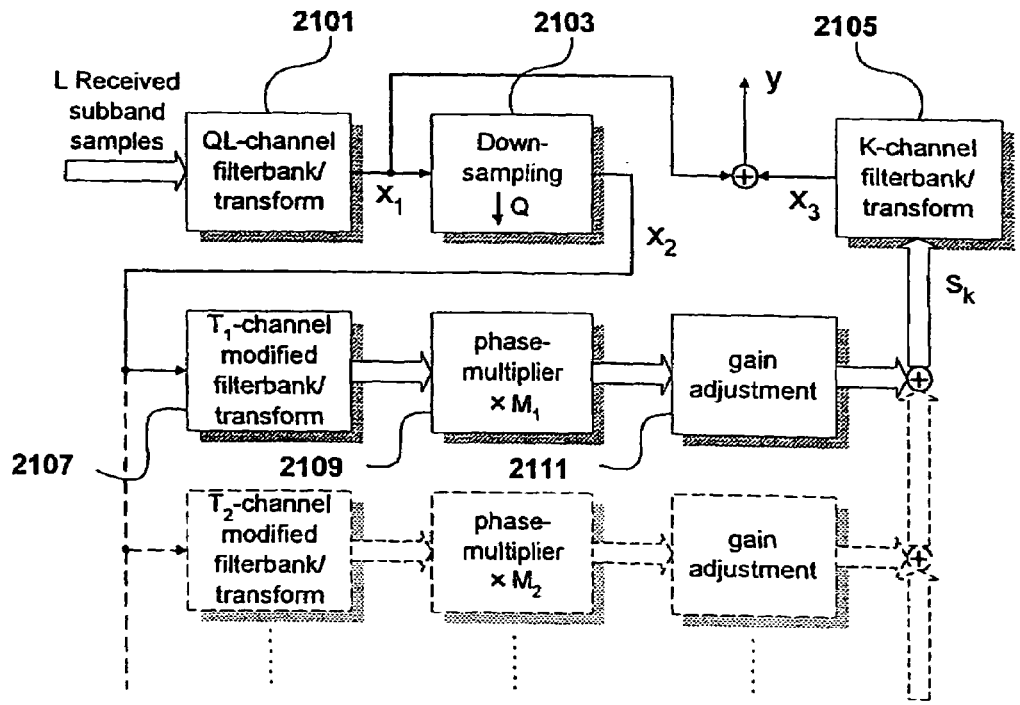
FIG. 21 is a block diagram for the improved multiband transposition in a maximally decimated filterbank operating on subband signals according to the present invention.
Figure 22:
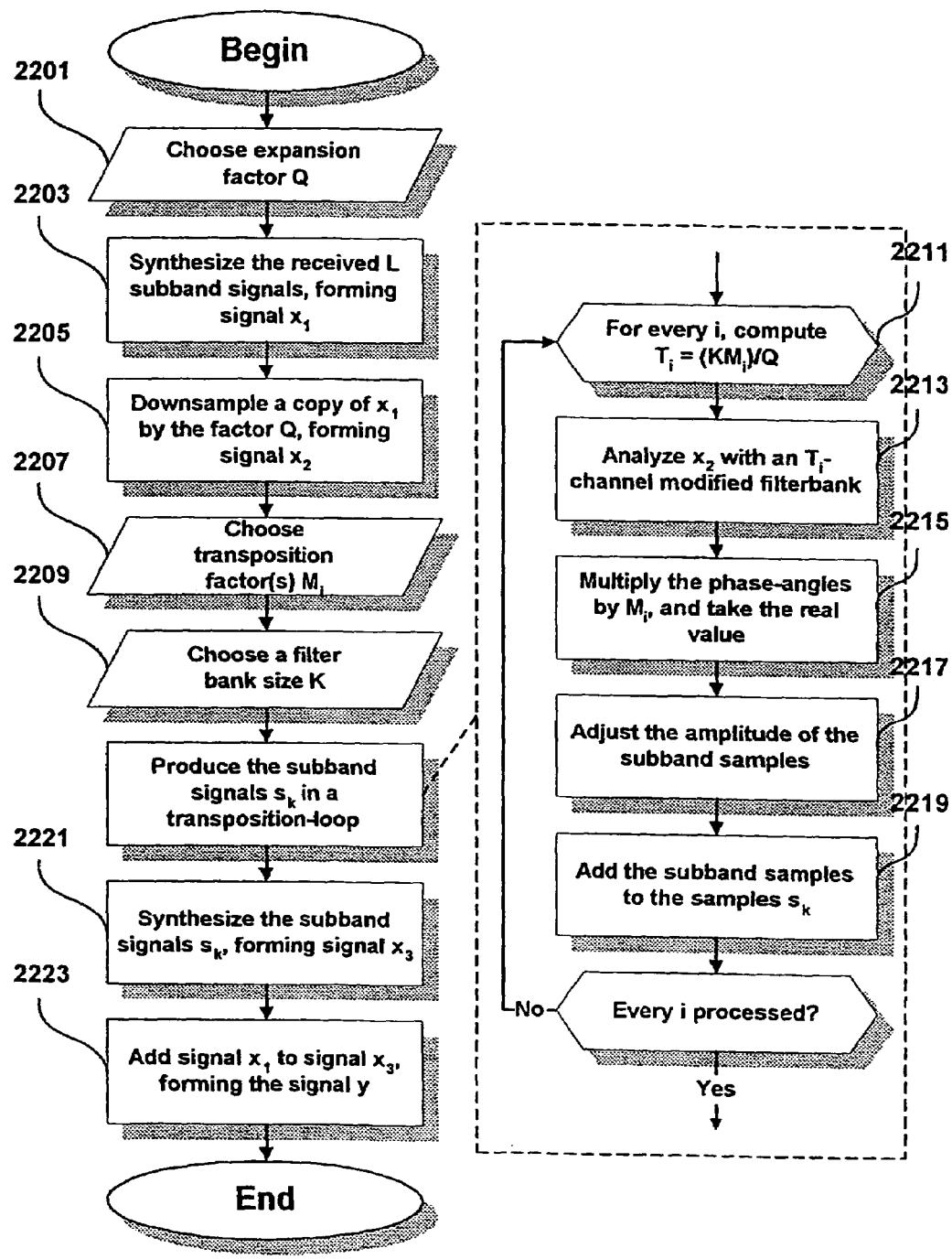
FIG. 22 is a flow-chart representing the improved multiband transposition in a maximally decimated filterbank operating on subband signals according to the present invention.

To achieve perfect transposition of sinusoids, an effective maximally decimated filter bank solution of the improved multiband transposition method is now presented. The system uses an additional modified analysis filter bank, while the synthesis filter bank is cosine modulated as described by Vaidyanathan ["Multirate Systems and Filter Banks" P. P. Vaidyanathan, Prentice Hall, Englewood Cliffs, N.J., 1993, ISBN 0-13-605718-7]. The steps for operation, using the improved multiband transposition method according to the present invention, based on maximally decimated filter banks, are shown schematically in FIG. 21 and in the flow-chart of FIG. 22 and are as follows:

1. The L received subband signals are synthesised with a QL-channel filter bank 2101, 2201, 2203, where the L(Q-1) upper channels are fed with zeros, to form signal $x_1(n)$, which is thus oversampled by the bandwidth expansion factor Q.
2. $x_1(n)$ is downsampled by a factor Q, to form signal $x_2(n')$ 2103, 2205, i.e. $x_2(n')=x_1(Qn')$.
3. An integer-value K is chosen as the size of a synthesis filter bank, constrained so that T=KM/Q is an integer, where T is the size of the modified analysis filter bank and M is the transposition factor 2207, 2209, 2211. K should preferably be chosen large for stationary (tonal) signals, and smaller for dynamic (transient) signals.
4. $x_2(n')$ is filtered through a T-channel modified analysis filter bank 2107, 2213, where the T analysis filters are exponentially modulated, producing a set of complex-valued subband signals. The subband signals are downsampled by a factor T/M, giving subband signals $v_k^{(M)}(n'')$, k=0, 1, . . . , T-1. Hence, the filter bank will be oversampled by a factor M.
5. The samples $v_k^{(M)}(n'')$ are converted to a polar representation (magnitude and phase-angle). The phase-angles are multiplied by the factor M, and the samples are converted back to a rectangular representation according to the scheme of FIG. 11. The real parts of the complex-valued samples are taken, giving the signals $s_k^{(M)}(n'')$ 2109, 2215. After this operation, the signals $s_k^{(M)}(n'')$ are critically sampled.
6. The gains of the signals $s_k^{(M)}(n'')$ are adjusted according to the principles of SBR-1 or SBR-2 2111, 2217.
7. The subband signals $s_k^{(M)}(n'')$, where $k \in [T/M, \min(K, T)-1]$, are synthesised with an ordinary cosine modulated K-channel filter bank, where the channels 0 through T/M-1 are fed with zeros 2105, 2221. This produces the signal $x_3^{(M)}(n)$.
8. $x_3^{(M)}(n)$ is finally added to $x_1(n)$ to give y(n) 2223, which is the desired spectral replicated signal.

Steps 3 to 6 may be repeated for different values of the transposition factor M, thus adding multiple harmonics to $x_1(n)$. This mode of operation is illustrated by the dotted figures of FIG. 21, and in FIG. 22, by iterating the loop over boxes 2211-2219. In this case, K is chosen as to make T integer-valued for all choices of M—for integer valued M:s; preferably select K as to make K/Q a positive integer. All subband signals $s_k^{(M_i)}(n'')$, where i=1, 2, . . . , m, and m is the number of transposition factors, are added according to $$s_k(n'') = \sum_{i=1}^{m} s_k^{(M_i)}(n'') \tag{17}$$

for every applicable k. In the first iteration of the loop of FIG. 22, the signals $s_k(n'')$ may be considered to be subband samples of zeros only, where k=0, 1, . . . ,K-1. In every loop, the new samples are added 2219 to $s_k(n'')$ as $$s_k(n'')=s_k(n'')+s_k^{(M_1)}(n''), \tag{18}$$

where k=K/Q, K/Q+1, . . . , min(K,$T_i$)-1. The subband signals $s_k(n'')$ are synthesised once with a K-channel filter bank according to step 7.

The modified analysis filter bank of step 4, is derived through the theory of cosine modulated filter banks, where the modulated lapped transform (MLT) ["Lapped Transforms for Efficient Transform/Subband Coding" H. S. Malvar, IEEE Trans ASSP, vol. 38, no. 6, 1990] is a special case. The impulse responses $h_k(n)$ of the filters in a T-channel cosine modulated filter bank may be written $$h_k(n) = C\, p_0(n)\cos\left[\frac{\pi}{2T}(2k+1)\left(n - \frac{N-1}{2}\right) + \Phi_k\right], \tag{19}$$

where k=0, 1, . . . , T-1, N is the length of the lowpass prototype filter $p_o(n)$, C is a constant and $\Phi_k$ is a phase-angle that ensues alias cancellation between adjacent channels. The constraints on $\Phi_k$ is $$\Phi_0 = \pm\frac{\pi}{4},\ \Phi_{T-1} = \pm\frac{\pi}{4}\ \text{and}\ \Phi_k = \Phi_{k-1} = \pm\frac{\pi}{2} \tag{20a-c}$$

which may be simplified to the closed form expression $$\Phi_k = \pm(-1)^k\frac{\pi}{4}. \tag{21}$$

With this choice of $\Phi_k$, perfect reconstruction systems or approximate reconstruction systems (pseudo QMF systems) may be obtained using synthesis filter banks with impulse responses as $$f_k(n) = C p_0(n)\cos\left[\frac{\pi}{2T}(2k+1)\left(n - \frac{N-1}{2}\right) - \Phi_k\right]. \tag{22}$$

Consider the filters (23)

$$h'_k(n) = C p_0(n)\sin\left[\frac{\pi}{2T}(2k+1)\left(n - \frac{N-1}{2}\right) + \Phi_k\right],$$

where $h'_k(n)$ are sine-modulated versions of the prototype filter $p_o(n)$. The filters $H'_k(z)$ and $H_k(z)$ have identical passband supports, but the phase responses differ. The passbands of the filters are actually Hilbert transforms of each other (this is not valid for frequencies close to ω=0 and ω=π). Combining Eq. 19 and Eq. 23 according to $$h_k^a(n) = h_k(n) + jh'_k(n) = C p_0(n)\exp\left[\frac{j\pi}{2T}(2k+1)\left(n - \frac{N-1}{2}\right) + j\Phi_k\right] \tag{24}$$

yields filters that have the same shape of the magnitude responses as $H_k(z)$ for positive frequencies but are zero for negative frequencies. Using a filter bank with impulse responses as in Eq. 24 gives a set of subband signals that may be interpreted as the analytic (complex) signals corresponding to the subband signals obtained from a filter bank with impulse responses as in Eq. 19. Analytic signals are suitable for manipulation, since the complex-valued samples may be written in a polar form, that is $z(n)=r(n)+j\,i(n)=|z(n)|\exp\{j\arg(z(n))\}$. However, when using the complex filter bank for transposition, the constraint on $\Phi_k$ has to be generalised to retain the alias cancellation property. The new constraint on $\Phi_k$, to ensure alias cancellation in combination with a synthesis filter bank with impulse responses as in Eq. 22 is $$\Phi_k = \pm(-1)^k \frac{\pi}{4M} \quad (25)$$

which simplifies to Eq. 21 when M=1. With this choice, transposed partials will have the same relative phases as they would have when M=1 (no transposition).

Combining Eq. 24 and Eq. 25 results in $$h_k^a(n) = Cp_0(n)\exp\left\{j\pi\left[\frac{(2k+1)}{2T}\left(n-\frac{N-1}{2}\right)\pm\frac{(-1)^k}{4M}\right]\right\} \quad (26)$$

which are the filters used in the modified filter bank of step 4, according to the present invention Some clarifications concerning step 5: downsampling the complex-valued subband signals by a factor T/M makes them oversampled by M, which is an essential criterion when the phase-angles subsequently are multiplied by the transposition actor M. The oversampling forces the number of subband samples per bandwidth, after transposition to the target range, to equal that of the source range. The individual bandwidths of the transposed subband signals are M times greater than those in the source range, due to the phase-multiplier. This makes the subband signals critically sampled after step 5, and additionally, there will be no zeros in the spectrum when transposing tonal signals.

In order to avoid trigonometric calculations, that is, having to compute die new subband signals as $$s_k^{(M)}(n'') = \text{real}\left\{|v_k^{(M)}(n'')|\exp\left\{jM\arctan\left(\frac{\text{imag}\{v_k^{(M)}(n'')\}}{\text{real}\{v_k^{(M)}(n'')\}}\right)\right\}\right\} = $$
$$= |v_k^{(M)}(n'')|\cos\left\{M\arctan\left(\frac{\text{imag}\{v_k^{(M)}(n'')\}}{\text{real}\{v_k^{(M)}(n'')\}}\right)\right\}, \quad (27)$$

where $|v_k^{(M)}(n'')|$ is the absolute value of $v_k^{(M)}(n'')$, the following trigonometric relationship is used:

$$\cos(M\alpha) = \cos^M(\alpha) - \binom{M}{2}\sin^2(\alpha)\cos^{M-2}(\alpha) + \binom{M}{4}\sin^4(\alpha)\cos^{M-4}(\alpha) - \ldots \quad (28)$$

Letting $$\alpha = \arctan\left(\frac{\text{imag}\{v_k^{(M)}(n'')\}}{\text{real}\{v_k^{(M)}(n'')\}}\right), \quad (29)$$

and noting that $$\cos(\alpha) = \cos\left(\arctan\left(\frac{\text{imag}\{v_k^{(M)}(n'')\}}{\text{real}\{v_k^{(M)}(n'')\}}\right)\right) = \frac{\text{real}\{v_k^{(M)}(n'')\}}{|v_k^{(M)}(n'')|}, \quad (30)$$

and $$\sin(\alpha) = \sin\left(\arctan\left(\frac{\text{imag}\{v_k^{(M)}(n'')\}}{\text{real}\{v_k^{(M)}(n'')\}}\right)\right) = \frac{\text{imag}\{v_k^{(M)}(n'')\}}{|v_k^{(M)}(n'')|}, \quad (31)$$

the computations of step 5 may be accomplished without trigonometric calculations, reducing computational complexity.

When using transpositions where M is even, obstacles with the phase-multiplier may arise, depending n the characteristics of the lowpass prototype filter $p_o(n)$. All applicable prototype filters have zeros on the unit circle in the z-plane. A zero on the unit circle imposes a 180° shift in the phase response of the filter. For M even, the phase-multiplier translates these shifts to 360° shifts; i.e. the phase-shifts vanish. The partials so located in frequency that such phase-shifts vanish will give rise to aliasing in the synthesised signal. The worst case scenario is when a partial is located at a point in frequency corresponding to the top of the first side lobe of an analysis filter. Depending on the rejection of this lobe in the magnitude response, the aliasing will be more or less audible. As an example, the first side lobe of the prototype filter used in the ISO/MPEG layer 1 and 2 standard is rejected 96 dB, while the rejection is only 23 dB for the first side lobe of the sine-window used in the MDCT scheme of the ISO/MPEG layer 3 standard. It is clear, that this type of aliasing, using the sine-window, will be audible. A solution to this problem will be presented, and is referred to as relative phase locking.

The filters $h_k^a(n)$ all have linear phase responses. The phase-angles $\Phi_k$ introduce relative phase differences between adjacent channels, and the zeros on the unit circle introduce 180° phase-shifts at locations in frequency that may differ between channels By monitoring the phase-difference between neighbouring subband signals, before the phase-multiplier is activated, it is easy to detect the channels that contain phase-inverted information. Considering tonal signals, the phase-difference is approximately π/2M, according to Eq. 25, for non-inverted signals, and consequently approximately π(1−1/2M) for signals, where either of the signals is inverted. The detection of inverted signals may be accomplished simply by computing the dot product of samples in adjacent subbands as $$v_k^{(M)}(n'')\circ v_{k+1}^{(M)}(n'')=\text{real}\{v_k^{(M)}(n'')\}\text{real}\{v_{k+1}^{(M)}(n'')\}+\text{imag}\{v_k^{(M)}(n'')\}\text{imag}\{v_{k+1}^{(M)}(n'')\}. \quad (32)$$

If the product in Eq. 32 is negative, the phase-difference is greater than 90°, and a phase-inversion condition is present. The phase-angles of the complex-valued subband signals are multiplied by M, according to the scheme of step 5, and finally, the inversion-tagged signals are negated. The relative phase locking method thus forces the 180° shifted subband signals to retain this shift after the phase-multiplication, and hence maintain the aliasing cancellation properties.

Spectral Envelope Adjustment

Most sounds, like speech and music, are characterised as products of slowly varying envelopes and rapidly varying carriers with constant amplitude, as described by Stockham ["The Application of Generalized Linearity to Automatic Gain Control" T. G. Stockham, Jr, IEEE Trans. on Audio and Electroacoustics, Vol. AU-16, No. 2, June 1968] and Eq. 1.

In split-band perceptual audio coders, the audio signal is segmented into frames and split into multiple frequency bands using subband filters or a time frequency domain transform. In most codec types, the signal is subsequently separated into two major signal components for transmission or storage, the spectral envelope representation and the normalised subband samples or coefficients. Throughout the following description, the term "subband samples" or "coefficients" refers to sample values obtained from subband filters as well as coefficients obtained from a time-to-frequency transform. The term "spectral envelope" or "scale factors" represent values of the subbands on a time-frame basis, such as the average or maximum magnitude in each subband, used for normalisation of the subband sample.

However, the spectral envelope may also be obtained using linear prediction LPC, [U.S. Pat. No. 5,684,920]. In a typical codec, the normalised subband samples require coding at a high bitrate (using approximately 90% of the available bitrate), compared to the slowly varying temporal envelopes, and thus the spectral envelopes, that may be coded at a much-reduced rate (using approximately 10% of the available bitrate).

Accurate spectral envelope of the replicated bandwidth is important if the timbral qualities of the original signal are to be preserved. The perceived timbre of a musical instrument, or voice, is mainly determined by the spectral distribution below a frequency $f_{tim}$, located in the highest octaves of hearing. The spectral details above $f_{tim}$ are thus of less importance, and consequently the highband fine structures obtained by the above transposition methods require no adjustment, while the coarse structures generally do. In order to enable such adjustment, it is useful to filter the spectral representation of the signal to separate the envelope coarse structure from the fine structure.

In the SBR-1 implementation according to the present invention, the highband coarse spectral envelope is estimated from the lowband information available at the coder. This estimation is performed by continuously monitoring the envelope of the lowband and adjusting the highband spectral envelope according to specific rules. A novel method to accomplish the envelope estimation uses asymptotes in a logarithmic frequency-magnitude space, which is equivalent to curve fitting with polynomials of varying order in the linear space. The level and slope of an upper portion of the lowband spectrum are estimated, and the estimates are used to define the level and slope of one or several segments representing the new highband envelope. The asymptote intersections are fixed in frequency and act as pivot points. However not always necessary, it is beneficial to stipulate constraints to keep the highband envelope excursions within realistic boundaries. An alternative approach to estimation of the spectral envelope is to use vector quantization, VQ, of a large number of representative spectral envelopes, and store these in a lookup-table or codebook. Vector quantization is performed by training the desired number of vectors on a vast amount of training data, in this case audio spectral envelopes. The training is usually done with the Generalised Lloyd Algorithm ["Vector Quantization and Signal Compression" A. Gersho, R. M. Gray, Kluwer Academic Publishers, USA 1992, ISBN 0-7923-9181-0], and yields vectors that optimally cover the contents of the training data. Considering a VQ codebook consisting of A spectral envelopes trained by B envelopes (B>>A), then the A envelopes represent the A most likely transitions from the lowband envelope to the highband envelope, based on B observations of a wide variety of sounds. This is, theoretically, the A optimum rules for predicting the envelope based on the B observations. When estimating anew highband spectral envelope, the original lowband envelope is used to search the codebook and the highband part of the best matching codebook entry is applied to create the new highband spectrum.

Figure 23:
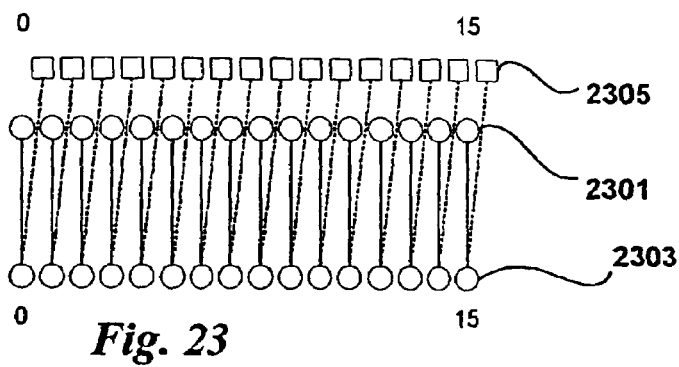
FIG. 23 illustrates subband samples and scalefactors of a typical codec.

In FIG. 23, the normalised subband samples are represented by 2301 and the spectral envelopes are represented by the scalefactors 2305. For illustrative purposes the transmission to decoder 2303 is shown in parallel fort In the SBR-2 method FIG. 24, the spectral envelope information is generated and transmitted according to FIG. 23, whereby only the lowband subband samples are transmitted. Transmitted scalefactors thus span the full frequency range while the subband samples only span a restricted frequency range, excluding the highband. At the decoder the lowband subband samples 2401 are transposed 2403 and combined with the received highband spectral envelope information 2405. In this way the synthetic highband spectral envelope is identical to that of the original, while maintaining a significant bit rate reduction.

Figure 24:
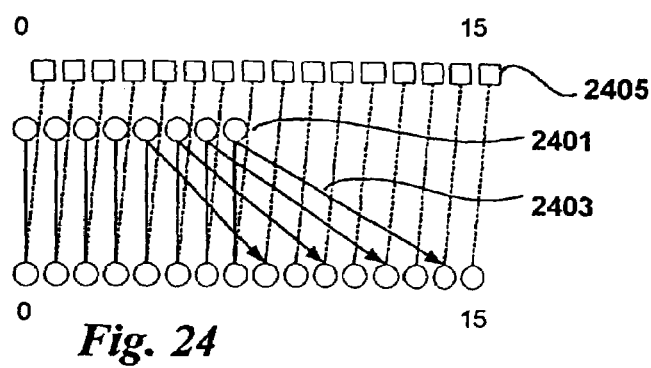
FIG. 24 illustrates subband samples and envelope information for SBR-2 according to the present invention.
Figure 25:
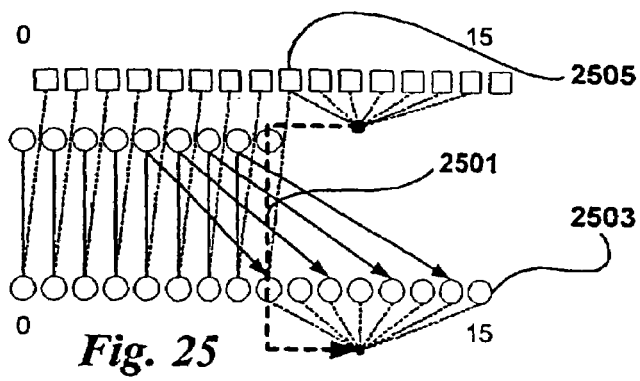
FIG. 25 illustrates hidden transmission of envelope information in SBR-2 according to the present invention.
Figure 26:
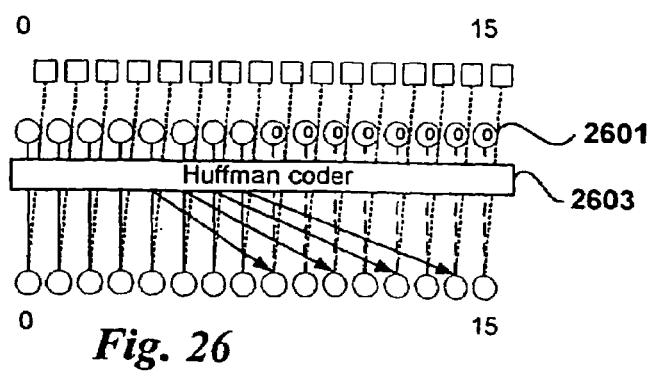
FIG. 26 illustrates redundancy coding in SBR-2 according to the present invention.

In some codecs, it is possible to transmit the scalefactors for the entire spectral envelope while omitting the highband subband samples, as shown in FIG. 24. Other codec standards stipulate that scalefactors and subband samples must cover the same frequency range, i.e. scale-factors cannot be transmitted if the subband samples are omitted. In such cases, there are several solutions; the highband spectral envelope information can be transmitted in separate frames, where the frames have their own headers and optional error protection, followed by the data Regular decoders, not taking advantage of the present invention, will not recognise the headers and therefore discard the extra frames. In a second solution, the highband spectral envelope information is transmitted as auxiliary data within the encoded bitstream. However, the available auxiliary data field must be large enough to hold the envelope information. In cases where none of the first two solutions are adaptable, a third solution, where the highband spectral envelope information is hidden as subband samples, may be applied. Subband scalefactors cover a large dynamic range, typically exceeding 100 dB. It is thus possible to set an arbitrary number of subband scalefactors, 2505 in FIG. 25, to very low values, and to transmit the highband scalefactors "camouflaged" as subband samples, 2501. This way of transmitting the highband scale factors to the decoder 2503 ensures compatibility with the bitstream syntax. Hence, arbitrary data may be transmitted in this fashion. A related method exists where information is coded into the subband sample stream [U.S. Pat. No. 5,687,191]. A fourth solution, FIG. 26, can be applied when a coding system uses Huffman- or other redundancy coding 2603. The subband samples for the highband is then set to zero 2601 or a constant value as to achieve a high redundancy.

Transient Response Improvements

Transient related artifacts are common problems in audio codecs, and similar artifacts occur in the present invention. In general, patching generates spectral "zeros" or notches, corresponding to time domain pre- and post-echoes, i.e. spurious transients before and after "true" transients. Albeit the P-blocks "fill in the zeros" for slowly varying tonal signals, the pre- and post-echoes remain. The improved multiband method is intended to work on discrete sinusoids, where the number of sinusoids is restricted to one per subband. Transients or noise in a subband can be viewed as a large number of discrete sinusoids within that subband. This generates intermodulation distortion. These artifacts are considered as additional quantization-noise sources connected to the replicated highband channels during transient intervals. Traditional methods to avoid pre and post-echo artifacts in perceptual audio coders, for example adaptive window switching, may hence be used to enhance the subjective quality of the improved multiband method. By using the transient detection provided by the codec or a separate detector and reducing the number of channels under transient conditions the quantization noise, is forced not to exceed the time-dependent masking threshold. A smaller number of channels is used during transient passages whereas a larger is used during tonal passages. Such adaptive window switching is commonly used in codecs in order to trade frequency resolution for time resolution. Different methods may be used in applications where the filterbank size is fixed. One approach is to shape the "quantization noise" in time via linear prediction in the spectral domain. The transposition is then performed on the residual signal which is the output of the linear prediction filter. Subsequently, an inverse prediction filter is applied to the original- and spectral replicated channels simultaneously. Another approach employs a commander system i.e. dynamic amplitude compression of the transient signal prior to transposition or coding, and a complementary expansion after transposition. It is also possible to switch between transposition methods in a signal dependent manner, for example, a high resolution filterbank transposition method is used for stationary signals, and a time-variant pattern search prediction method is employed for transient signals.

Practical Implementations

Figure 27:
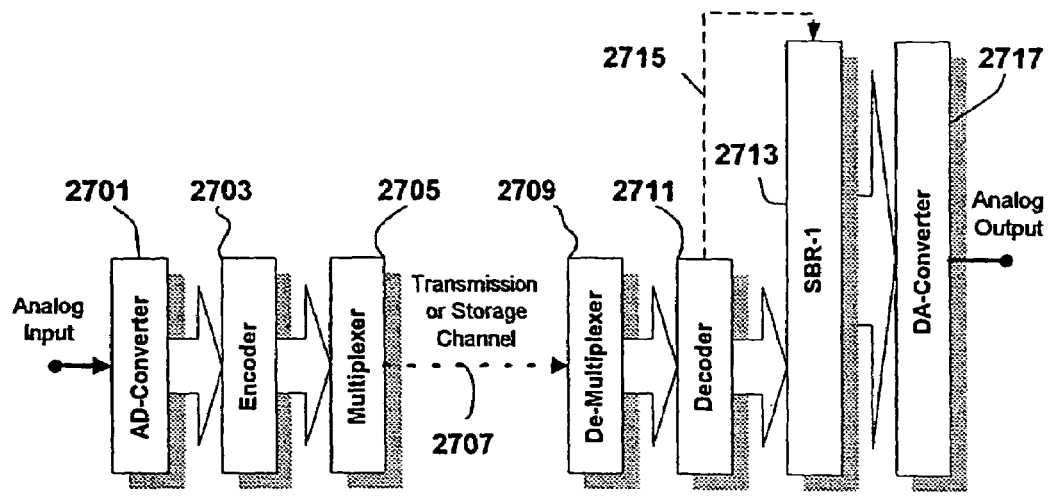
FIG. 27 illustrates an implementation of a codec using the SBR-1 method according to the present invention.

Using a standard signal-processor or a powerful PC, real-time operation of a SBR-enhanced codec is possible. The SBR enhanced codec may also be hard-coded on a custom chip. It may also be implemented in various kinds of systems for storage or transmission of signals, analogue or digital, using arbitrary codecs, FIG. 27 and FIG. 28. The SBR-1 method may be integrated in a decoder or supplied as an add-on hardware or software post-processing module. The SBR-2 method needs additional modification of the encoder. In FIG. 27 the analogue input signal is fed to the A/D-converter 2701, forming a digital signal which is fed to the an arbitrary encoder 2703, where source coding is performed. The signal fed into the system may be of such a low-pass type that spectral bands within the auditory range already have been discarded, or spectral bands are discarded in the arbitrary encoder. The resulting lowband signals are fed to the multiplexer 2705, forming a serial bitstream which is transmitted or stored 2707. The demultiplexer 2709 restores the signals and feeds them to an arbitrary decoder 2711. The spectral envelope information 2715 is estimated at the decoder 2713 and fed to the SBR-1 unit 2714 which transposes the lowband signal to a highband signal and creates an envelope adjusted wideband signal. Finally, the digital wideband signal is converted 2717 to an analogue output signal.

Figure 28:
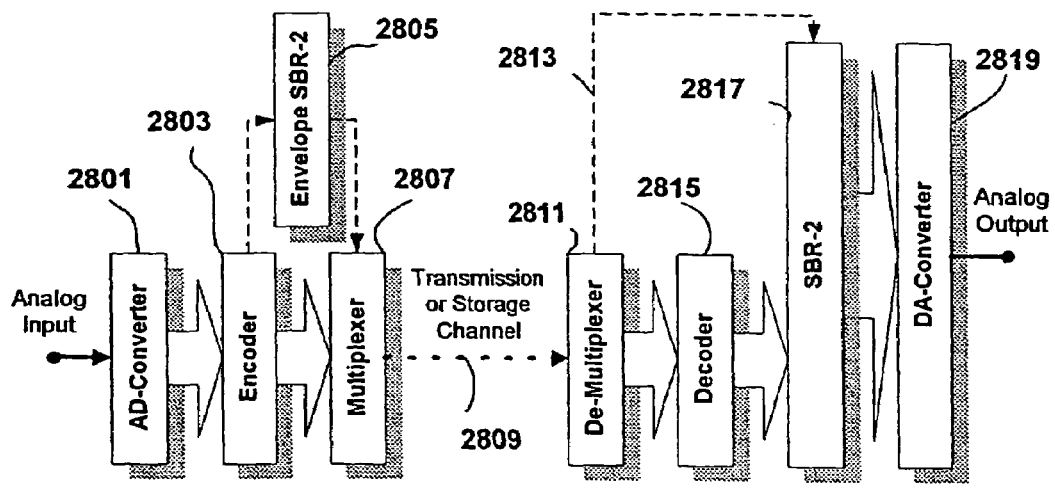
FIG. 28 illustrates an implementation of a coded using the SBR-2 method according to the present invention.

The SBR-2 method needs additional modification of the encoder. In FIG. 28 the analogue input signal is fed to the A/D-converter 2801, forming a digital signal which is fed to the an arbitrary encoder 2803, where source coding is performed. The spectral envelope information is extracted 2805. The resulting signals, lowband subband samples or coefficients and wideband envelope information, are fed to the multiplexer 2807, forming a serial bitstream which is transmitted or stored 2809. The de-multiplexer 2811 restores the signals, lowband subband samples or coefficients and wideband envelope information, and feeds them to an arbitrary decoder 2815. The spectral envelope information 2813 is fed from the de-multiplexer 2811 to the SBR-2 unit 2817 which transposes the lowband signal to a highband signal and creates an envelope adjusted wideband signal. Finally, the digital wideband signal is converted 2819 to an analogue output signal.

Figure 29:
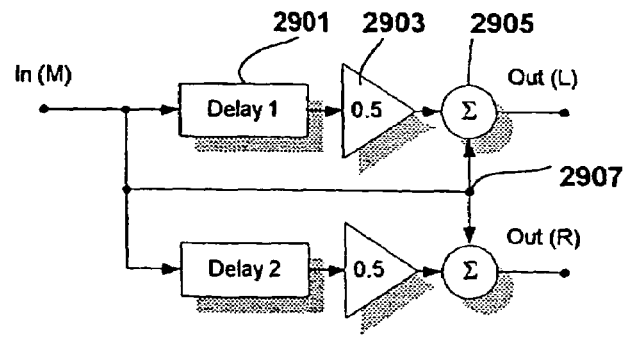
FIG. 29 is a block diagram of a "pseudo-stereo" generator according to the present invention.

When only very low bitrates are available, (Internet and slow telephone modems, AM-broadcasting etc.) mono coding of the audio program material is unavoidable. In order to improve the perceived quality and make the programme more pleasant sounding, a simple "pseudo-stereo" generator, FIG. 29, is obtained by the introduction of a tapped delayline 2901. This may feed 10 ms and 15 ms delayed signals at approximately −6 dB 2903 to each output channel in addition to the original mono signal 2905. The pseudo-stereo generator offers a valuable perceptual improvement at a low computational cost.

The above-described embodiments are merely illustrative for the principles of the present invention for audio source coding improvement. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

The invention claimed is:

1. A method for transposition by a transposer, wherein a first
   signal is either expanded in time by duplicating segments of the first signal and downsampling, or is compressed in time by discarding segments of the first signal and up-sampling, comprising the following steps:
   performing a transient detection on a portion of the first signal, the portion including an input segment;
   determining a codebook based on which a signal segment of the first signal is used when duplicating or discarding parts of the first signal to obtain an output segment, depending on an outcome of the step of performing a transient detection;
   wherein the step of determining includes the following steps:
   when a transient in a current portion of the input signal is not detected or a transient detected in an earlier portion of the input signal is not yet processed, determining the codebook such that an end of the codebook is (with respect to time) to the left of a current input segment of the first signal;
   when a transient in a portion of the input signal is detected and when the detected transient in the input signal is already processed, determining the codebook such that the codebook (with respect to time) extends to the right of a current input segment of the first signal so that a search for a synchronization point in the determined codebook prior to the transient is not allowed;
   searching for a synchronization point in a codebook as determined in the step of determining by correlating a comparison segment of a previous output segment with the codebook as determined in the step of determining; and
   generating a current output segment by using samples from the codebook for the current input segment starting from the synchronization point obtained in the step of searching, wherein a transposition factor is determined by a length of the current input segment and a length of the current output segment.

2. A method according to claim 1, in which several transposers are interconnected in order to share synchronization point information.

3. A method according to claim 2, in which the transposers are connected to a suitable filter bank, and signals fed into each of the several transposers are filtered as to obtain an arbitrary spectral envelope of a new signal being the sum of the signals being fed into the transposers.

4. A method according to claim 1, in which the codebook is determined such that an end of the codebook coincides with a start of the current input segment, when a transient in a current portion of the input signal is not detected or a transient detected in an earlier portion of the input signal is not yet processed.

5. A method according to claim 1, in which the codebook is determined such that an end of the codebook coincides with an end of the current input segment and a start of the codebook coincides with a start of the previous input segment, when a transient in a portion of the input signal is detected and when the detected transient in the input signal is already processed.

6. A method according to claim 1, in which a length of the portion of the input signal used for transient detection is equal to a length of the output segment.

7. A method according to claim 1, in which the step of searching is performed such that a synchronization point found in a preceding search is used in a current search.

8. An apparatus for transposition, wherein a first signal is either expanded in time by duplicating segments of the first signal and down-sampling, or is compressed in time by discarding segments of the first signal and upsampling, comprising:

a transient detector for performing a transient detection on a portion of the first signal, the portion including an input segment;

a processor for determining a codebook based on which a signal segment of the first signal is used when duplicating or discarding parts of the first signal to obtain an output segment, depending on an outcome of the step of performing a transient detection;

wherein the processor is operative to perform the following steps:

when a transient in a current portion of the input signal is not detected or a transient detected in an earlier portion of the input signal is not yet processed, determining the codebook such that an end of the codebook is (with respect to time) to the left of a current input segment of the first signal;

when a transient in a portion of the input signal is detected and when the detected transient in the input signal is already processed, determining the codebook such that the codebook (with respect to time) extends to the right of a current input segment of the first signal so that a search for a synchronization point in the determined codebook prior to the transient is not allowed;

a searcher for searching a synchronization point in a codebook as determined in the step of determining by correlating a comparison segment of a previous output segment with the codebook as determined in the step of determining; and a generator for generating a current output segment by using samples from the codebook for the current input segment starting from the synchronization point obtained in the step of searching, wherein a transposition factor is determined by a length of the current input segment and a length of the current output segment.

* * * * *